United States Patent
Eto et al.

(10) Patent No.: US 10,832,636 B2
(45) Date of Patent: Nov. 10, 2020

(54) IMAGE PROCESSING APPARATUS, IMAGE PROCESSING METHOD, AND PROGRAM

(71) Applicant: SONY CORPORATION, Tokyo (JP)

(72) Inventors: Hiroaki Eto, Kanagawa (JP); Toshiyuki Ogura, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/324,412

(22) PCT Filed: Aug. 7, 2017

(86) PCT No.: PCT/JP2017/028553
§ 371 (c)(1),
(2) Date: Feb. 8, 2019

(87) PCT Pub. No.: WO2018/047557
PCT Pub. Date: Mar. 15, 2018

(65) Prior Publication Data
US 2019/0172421 A1    Jun. 6, 2019

(30) Foreign Application Priority Data

Sep. 6, 2016    (JP) ................. 2016-173281

(51) Int. Cl.
G09G 5/10     (2006.01)
H04N 5/20     (2006.01)
G09G 5/00     (2006.01)

(52) U.S. Cl.
CPC ............ *G09G 5/10* (2013.01); *G09G 5/005* (2013.01); *G09G 5/006* (2013.01); *H04N 5/20* (2013.01);
(Continued)

(58) Field of Classification Search
CPC .................................................. G09G 5/101
(Continued)

(56) References Cited

U.S. PATENT DOCUMENTS

2013/0076974 A1* 3/2013 Atkins ................... H04N 5/235
                                                         348/362
2016/0205338 A1   7/2016 Kozuka et al.
2016/0360215 A1* 12/2016 Rusanovskyy ...... H04N 19/169

FOREIGN PATENT DOCUMENTS

JP    2006-179978 A    7/2006
JP    2012-230635 A    11/2012
(Continued)

OTHER PUBLICATIONS

Jun. 28, 2019, European Search Report issued for related EP Application No. 17848501.7.

*Primary Examiner* — Shivang I Patel
(74) *Attorney, Agent, or Firm* — Paratus Law Group, PLLC

(57) ABSTRACT

Provided is a device and a method in which an HDR image of which a setting luminance is higher than the highest allowable luminance of a display unit, can be displayed as a bright image in a bright audiovisual environment. An adjusted luminance for output is calculated by multiplying an output luminance calculated according to an input/output transfer function corresponding to an input HDR image, and a predetermined gain, together, and thus, a display image is generated. An image signal processing unit sets a reference point P to be in a position based on the highest allowable luminance of a display unit, and calculates the adjusted luminance for output by applying a gain function of setting a gain, based on the reference point P, to an input/output transfer function according to the input HDR image, and thus, generates the display image.

18 Claims, 23 Drawing Sheets

(52) U.S. Cl.
CPC ............... *G09G 2320/066* (2013.01); *G09G 2320/0626* (2013.01); *G09G 2320/0646* (2013.01); *G09G 2320/0673* (2013.01); *G09G 2320/08* (2013.01); *G09G 2360/16* (2013.01)

(58) Field of Classification Search
USPC ........................................................ 345/589
See application file for complete search history.

(56) References Cited

FOREIGN PATENT DOCUMENTS

| JP | 2014-502480 A | 1/2014 |
| WO | WO 2012/127401 A1 | 9/2012 |
| WO | WO 2014/192577 A1 | 12/2014 |

\* cited by examiner

FIG. 4
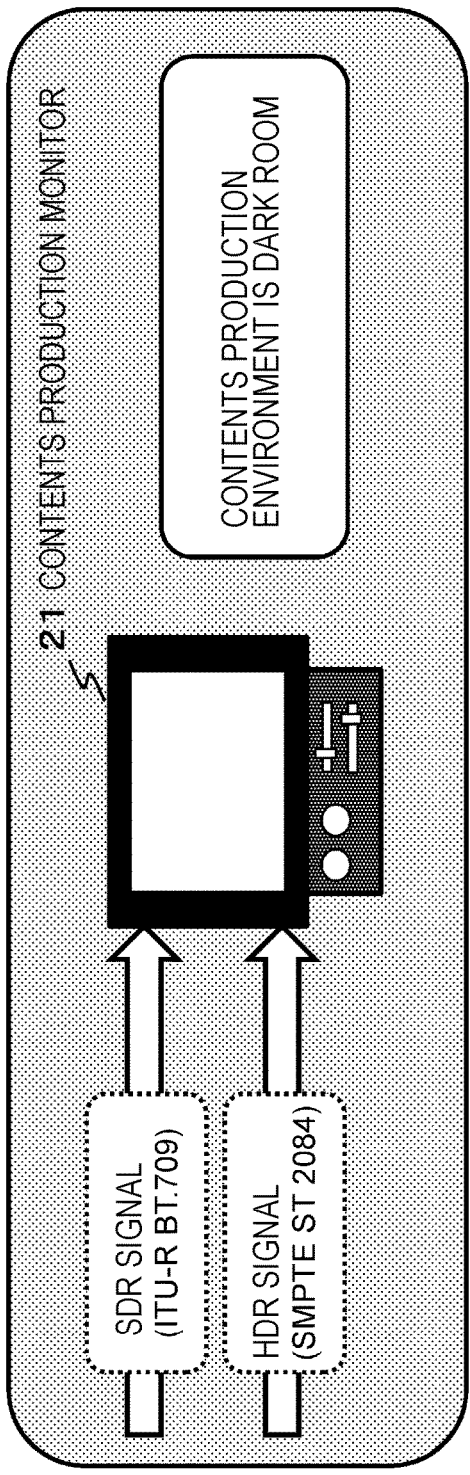
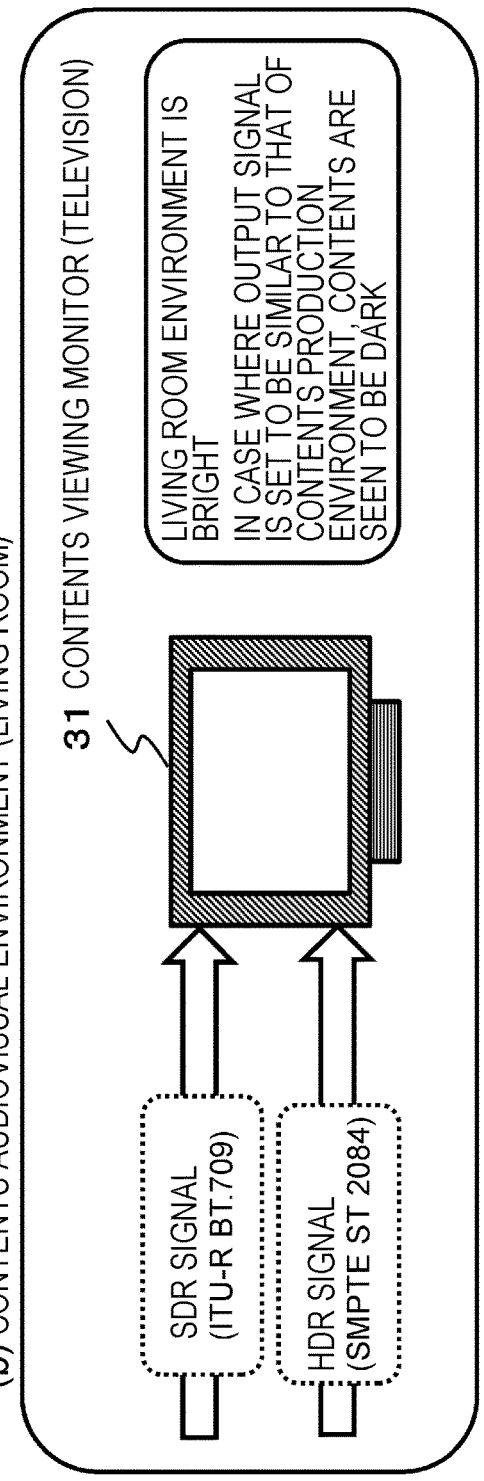

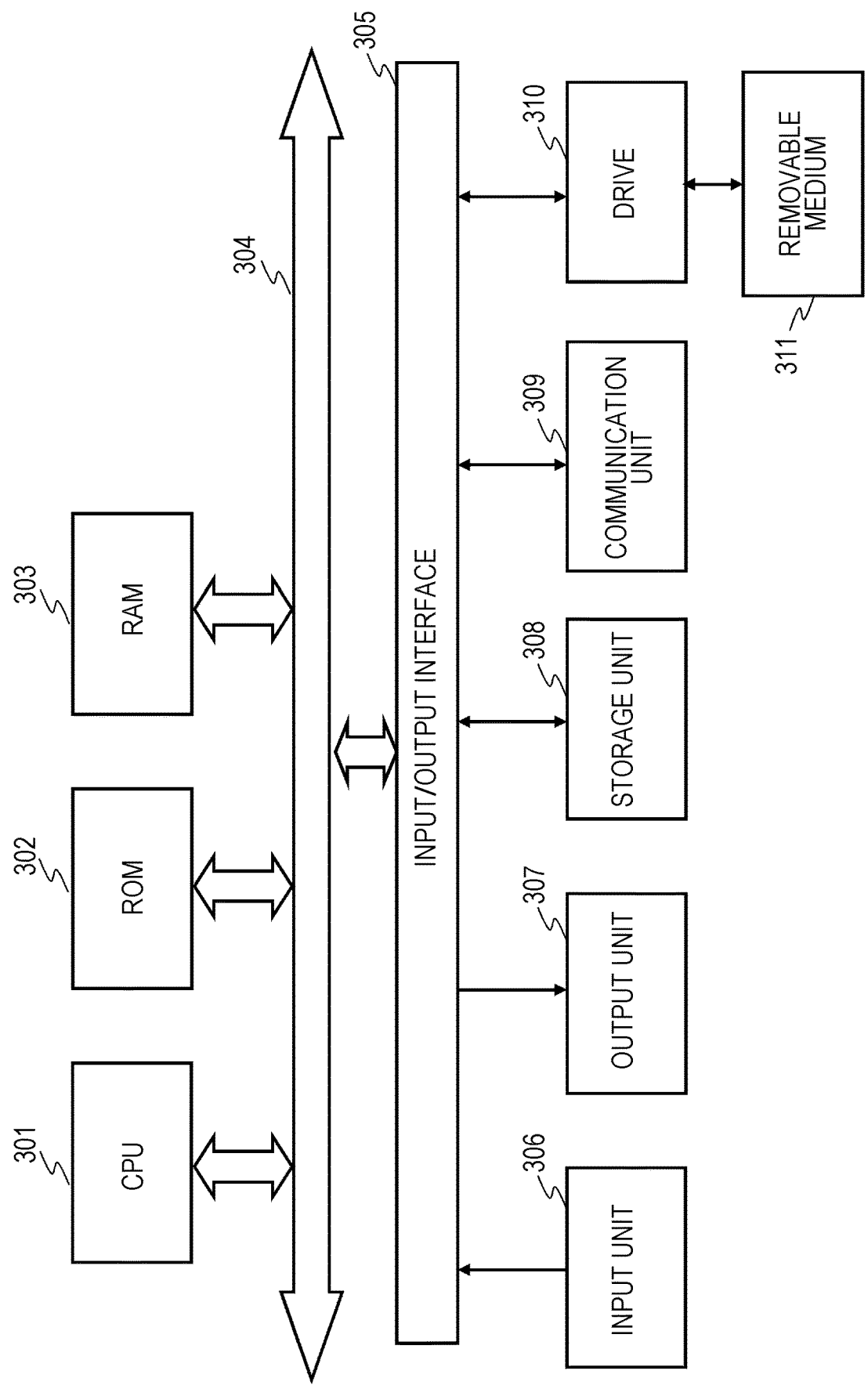

IMAGE PROCESSING APPARATUS, IMAGE PROCESSING METHOD, AND PROGRAM

CROSS REFERENCE TO PRIOR APPLICATION

This application is a National Stage Patent Application of PCT International Patent Application No. PCT/JP2017/028553 (filed on Aug. 7, 2017) under 35 U.S.C. § 371, which claims priority to Japanese Patent Application No. 2016-173281 (filed on Sep. 6, 2016), which are all hereby incorporated by reference in their entirety.

TECHNICAL FIELD

The present disclosure relates to an image processing apparatus, an image processing method, and a program. More specifically, the present disclosure relates to an image processing apparatus, an image processing method, and a program, in which a high dynamic range image is displayed on a display unit such as a television, without decreasing a brightness.

BACKGROUND ART

Recently, a high dynamic range of an image has progressed, according to an increase in the bit of an imaging element (an image sensor), for example.

In general, the dynamic range of the image can be expressed by a ratio of the minimum luminance to the maximum luminance.

In a high dynamic range image, that is, a high dynamic range (HDR) image, a contrast ratio of the maximum lightness color to the minimum lightness color, for example, is greater than or equal to 10000:1, and thus, it is possible to realistically express the real world.

The HDR image is capable of recording almost all luminances in a visible range, and is capable of supporting a dynamic range and a color range equivalent to the human visual characteristic. The HDR image can be referred to as an image having extremely high image quality compared to a standard dynamic range (SDR) image, which is an image of the related art, from the viewpoint of realistic expression of shades, the expression of glare, or the like.

Many existing general home televisions are an SDR television corresponding to the SDR image, in which a dynamic range of an image that can be displayed, is narrower than that of the HDR image.

A luminance range that can be expressed by the SDR image, is a range of approximately 0 nit to 100 nit. In contrast, a luminance range that can be expressed by the HDR image, is a range of approximately 0 nit to 10000 nit, and the HDR image is an image capable of outputting the highest luminance that is 100 times the luminance of the SDR image. Furthermore, the luminance unit of nit is luminance unit same as candela/square meter ($cd/m^2$) that is luminance unit of International System of Units (SI).

In the future television broadcasting contents, or the contents stored in a medium such as a Blu-ray (registered trademark) disc (BD), HDR image contents having a luminance range of approximately 0 nit to 10000 nit, are expected to be the mainstream.

Processing of setting a dynamic range of the original contents to be adequate to a display device (a display) of an image output destination (referred to as display mapping), has been considered from the related art (for example, refer to Patent Document 1).

For example, in a case where the SDR image including an image of which a luminance range is 0 nit to 100 nit, is displayed on the latest television of which the maximum output luminance is 500 nit, the luminance of the SDR image wholly increases, and thus, it is possible to perform processing of displaying the SDR image as a bright image of 0 nit to 500 nit. Such output value adjustment is executed, and thus, in the case of viewing a television in a bright living room or the like, it is possible to view the image as a bright image without feeling that the image is dark.

CITATION LIST

Patent Document

Patent Document 1: Japanese Translation of PCT International Application Publication No. 2014-502480

SUMMARY OF THE INVENTION

Problems to be Solved by the Invention

The input/output characteristic of the SDR image is relative value setting, and it is allowed to freely adjust the output luminance, according to a display function of the display device. That is, an output luminance value with respect to an input value is not uniquely specified. Accordingly, it is allowed to freely control the output luminance value, according to an output allowable range of the display device.

In contrast, SMPTE ST 2084 is exemplified as one of input/output characteristic specification curves of the HDR image, being currently considered. In the curve, it is considered that it is preferable to perform luminance output in absolute value setting of uniquely setting the output luminance value with respect to the input value.

In a case where the HDR image including an image of which a luminance range is 0 nit to 10000 nit, is displayed on the display device having a display function of 0 nit to 500 nit, according to the absolute value specification, a pixel of 500 nit to 10000 nit, is displayed in the luminance of the maximum output value of 500 nit.

On the other hand, the pixel of 0 nit to 500 nit, is directly output in the luminance of 0 nit to 500 nit. A pixel of 0 nit to 100 nit, is also directly output in the luminance of 0 nit to 100 nit.

In the SDR image described above, the pixel of 0 ni to 100 ni is displayed by increasing the luminance to a pixel value of 0 nit to 500 nit, but in the HDR image, the pixel is directly displayed in the luminance of 0 nit to 100 nit. That is, the HDR image is displayed as a dark image, compared to the SDR image of the related art. As a result thereof, in particular, a user performing viewing in a bright environment such as a living room environment, may feel that the HDR image is darker than the SDR image of the related art, and has image quality lower than that of the SDR image of the related art.

The present disclosure, for example, has been made in consideration of such circumstances described above, and an object thereof is to provide an image processing apparatus, an image processing method, and a program, in which image display is realized without feeling a decrease in a brightness.

Solutions to Problems

A first aspect of the present disclosure lies in
an image processing apparatus, including:

an image signal processing unit configured to determine an output value with respect to an input signal value of an input image, in which in a case where a maximum output luminance of the input image is greater than or equal to the highest allowable luminance of a display unit, the image signal processing unit sets a reference point P to be in an input signal position in which an output luminance of the input image is less than or equal to the highest allowable luminance of the display unit, and the image signal processing unit calculates an adjusted luminance for output by multiplying a gain set to be greater than or equal to 1 in an input signal range in which the input signal value is less than or equal to the reference point P, and to be less than or equal to 1 in an input signal range in which the input signal value is greater than or equal to the reference point P, and an output value calculated according to an input/output transfer function corresponding to the input image, together, and generates a display image having the calculated adjusted luminance for output.

Further, a second aspect of the present disclosure lies in an image processing method to be executed in an image processing apparatus, the image processing apparatus including an image signal processing unit configured to determine an output value with respect to an input signal value of an input image, the method of allowing the image signal processing unit:

to set a reference point P to be in an input signal position in which an output luminance of the input image is less than or equal to the highest allowable luminance of a display unit, in a case where a maximum output luminance of the input image is greater than or equal to the highest allowable luminance of the display unit; and to calculate an adjusted luminance for output by multiplying a gain set to be greater than or equal to 1 in an input signal range in which the input signal value is less than or equal to the reference point P, and to be less than or equal to 1 in an input signal range in which the input signal value is greater than or equal to the reference point P, and an output value calculated according to an input/output transfer function corresponding to the input image, together, and to generate a display image having the calculated adjusted luminance for output.

Further, a third aspect of the present disclosure lies in a program for allowing image processing to be executed in an image processing apparatus including an image signal processing unit configured to determine an output value with respect to an input signal value of an input image, the program of allowing the image signal processing unit:

to set a reference point P to be in an input signal position in which an output luminance of the input image is less than or equal to the highest allowable luminance of a display unit, in a case where a maximum output luminance of the input image is greater than or equal to the highest allowable luminance of the display unit; and to calculate an adjusted luminance for output by multiplying a gain set to be greater than or equal to 1 in an input signal range in which the input signal value is less than or equal to the reference point P, and to be less than or equal to 1 in an input signal range in which the input signal value is greater than or equal to the reference point P, and an output value calculated according to an input/output transfer function corresponding to the input image, together, and to generate a display image having the calculated adjusted luminance for output.

Furthermore, the program of the present disclosure, for example, is a program that can be provided by a recording medium or a communication medium, provided in a computer readable format, with respect to an information processing apparatus or a computer system executing various programs and codes. Such a program is provided in the computer readable format, and thus, the processing according to the program is realized on the information processing apparatus or the computer system.

Other objects, features, or advantages of the present disclosure, will become apparent from the detailed description based on examples of the present disclosure as described later, or the attached drawings. Furthermore, herein, the system has a logically assembled configuration of a plurality of devices, but is not limited to a system in which the respective devices of the configuration are in the same housing.

Effects of the Invention

According to the configuration of one example of the present disclosure, a device and a method are realized in which an HDR image of which a setting luminance is higher than the highest allowable luminance of a display unit, can be displayed as a bright image in a bright audiovisual environment.

Specifically, an adjusted luminance for output is calculated by multiplying an output luminance calculated according to an input/output transfer function corresponding to an input HDR image, and a predetermined gain, together, and thus, a display image is generated. An image signal processing unit sets a reference point P to be in a position where an output value of the input/output transfer function corresponding to the input HDR image, is less than or equal to the highest allowable luminance of a display unit, and calculates the adjusted luminance for output by applying a gain function of setting a gain to be greater than or equal to 1 in an input signal range in which an input signal value is less than or equal to the reference point P, and to be less than or equal to 1 in an input signal range in which the input signal value is greater than or equal to the reference point P, to the input/output transfer function corresponding to the input HDR image, and thus, generates the display image.

According to this configuration, a device and a method are realized in which an HDR image of which a setting luminance is higher than the highest allowable luminance of a display unit, can be displayed as a bright image in a bright audiovisual environment.

Furthermore, the effects described herein, are merely an example and are not limited, and may be additional effects.

BRIEF DESCRIPTION OF DRAWINGS

FIG. 4 is a diagram illustrating an example of a contents production environment and an audiovisual environment.

FIG. 23 is a diagram illustrating a configuration example of the image processing apparatus of the present disclosure.

MODE FOR CARRYING OUT THE INVENTION

Hereinafter, an image processing apparatus, an image processing method, and a program of the present disclosure, will be described in detail, with reference to the drawings.

Furthermore, the description will be made according to the following items.

1. Outline of Image Display Processing in Image Processing Apparatus
2. Image Characteristic of HDR Image and SDR Image
3. Control Processing of Output Image based on Difference in Brightness between Contents Production Environment and Contents Audiovisual Environment
4. Problem of Control Processing of Output Image with respect to HDR Image
5. Configuration of Realizing Display of Bright HDR Image by Preventing Decrease in Luminance of HDR Image
6. Plurality Of Different Setting Examples of Reference Point P
7. Example of Changing Gain Setting or Reference Point according to Mode
8. Processing Sequence to be Executed by Image Processing Apparatus
9. Configuration Example of Image Processing Apparatus
10. Summary of Configurations of Present Disclosure 1. Outline of Image Display Processing in Image Processing Apparatus First, a general processing example of an image display processing in an image processing apparatus, will be described with reference to FIG. 1 and the following.

Figure 1:
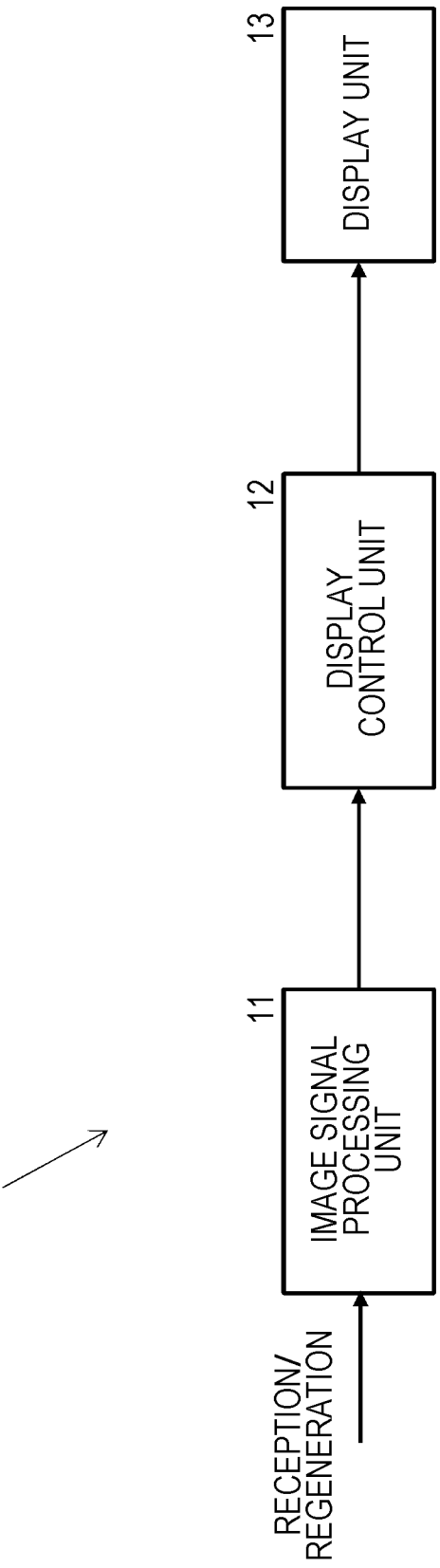
FIG. 1 is a diagram illustrating a configuration and processing of an image processing apparatus.

An image processing apparatus 10 of FIG. 1, for example, is a user device (a client) including a display unit, such as a television, a smart phone, and a PC.

The image processing apparatus 10, for example, displays received image data from a broadcasting station, a streaming server, or the like, or regeneration image data from a medium such as a Blu-ray (registered trademark) disc (BD), on a display unit 13.

An image signal processing unit 11, for example, decodes a coded stream input from a broadcasting station or a server, or a medium such as a Blu-ray (registered trademark) disc (BD), and outputs an image signal generated on the basis of the decoded data, to a display control unit 12.

For example, an output signal according to a display characteristic of the display unit 13, is generated, and is output to the display control unit 12.

The display control unit 12 generates an output signal with respect to the display unit 13, on the basis of an input signal from the image signal processing unit 11.

The display unit 13 drives a display panel by using the input signal from the display control unit 12, and executes image display.

The image data configuring the contents provided from a broadcasting station or a server, or the contents stored in a medium, has been changed to an image having high quality, with the times. Specifically, the image data has been transitioned from a 2 K image to a high resolution image referred to as a 4 K image or an 8 K image.

Further, a high dynamic range (HDR) image, in which an image in a wide luminance range from a low luminance to a high luminance, can be faithfully reproduced, compared to a standard dynamic range (SDR) image, has been widely used.

The HDR image is an image capable of expressing a luminance approximately equivalent to a visible range, of which a dynamic range to be expressible, is wider than that of the SDR image, and is capable of supporting a dynamic range and a color range, approximately equivalent to the human visual characteristic.

The SDR image, for example, is output by a signal value of 8 bits to 10 bits in which a luminance is subjected to non-linear transfer by using an optical-electro transfer function (OETF) based on ITU-R BT.709 or ITU-R BT.1886.

On the other hand, the HDR image, for example, is output by a signal value 10 bits to 12 bits in which a luminance is subjected to non-linear transfer by using an optical-electro transfer function (OETF) based on ITU-R BT.2020.

As described above, a luminance range to be expressible, of the SDR image, is a range of approximately 0 nit to 100 nit. In contrast, a luminance range to be expressible, of the HDR image, is a range of approximately 0 nit to 10000 nit.

Thus, the HDR image is an image in which the highest luminance that is 100 times the luminance of the SDR image, can be output. Furthermore, the luminance unit of nit is luminance unit same as candela/square meter (cd/m$^2$) that is luminance unit of International System of Units (SI).

In the future television broadcasting contents or the contents stored in a medium such as a Blu-ray (registered trademark) disc (BD), HDR image contents having a luminance range of approximately 0 nit to 10000 nit, are expected to be the mainstream.

However, as described above, in a display device from which such contents are viewed, such as a home television, it is expected that it is difficult to output a high luminance level of 10000 nit, both now and in the future.

In a television corresponding to the SDR image, currently widely used, the maximum luminance level that can be output, is approximately 100 nit, and in a television corresponding to an HDR, assumed to be popular in the future, it is assumed that the maximum luminance is suppressed to be less than or equal to approximately 500 nit to 1000 nit, from a relationship such as power consumption.

Accordingly, in the HDR image where the maximum luminance of the broadcasting contents or the contents stored in a medium is 10000 nit, there is a case where the maximum luminance has to be displayed on a display device such as a television, as an image of less than or equal to 1000 nit.

However, as described above, in a case where the HDR image having a luminance range of 0 nit to 10000 nit is subjected to display processing, in a luminance range that can be output from the display device (the display), for example, in a range of 0 nit to 1000 nit, according to absolute value setting, there may be an impression that it is a dark image.

That is, in a case where the HDR image is displayed in the absolute value setting in which the output value setting with respect to the input value is not changed, an impression that the image is darker than an SDR display image subjected to control of improving the output value (the luminance) with respect to the SDR image, that is, relative value setting in which the output value with respect to the input can be changed, may be imparted to a viewer.

2. Image Characteristic of HDR Image and SDR Image

Next, the image characteristic of the HDR image and the SDR image will be described with reference to FIG. 2.

Figure 2:
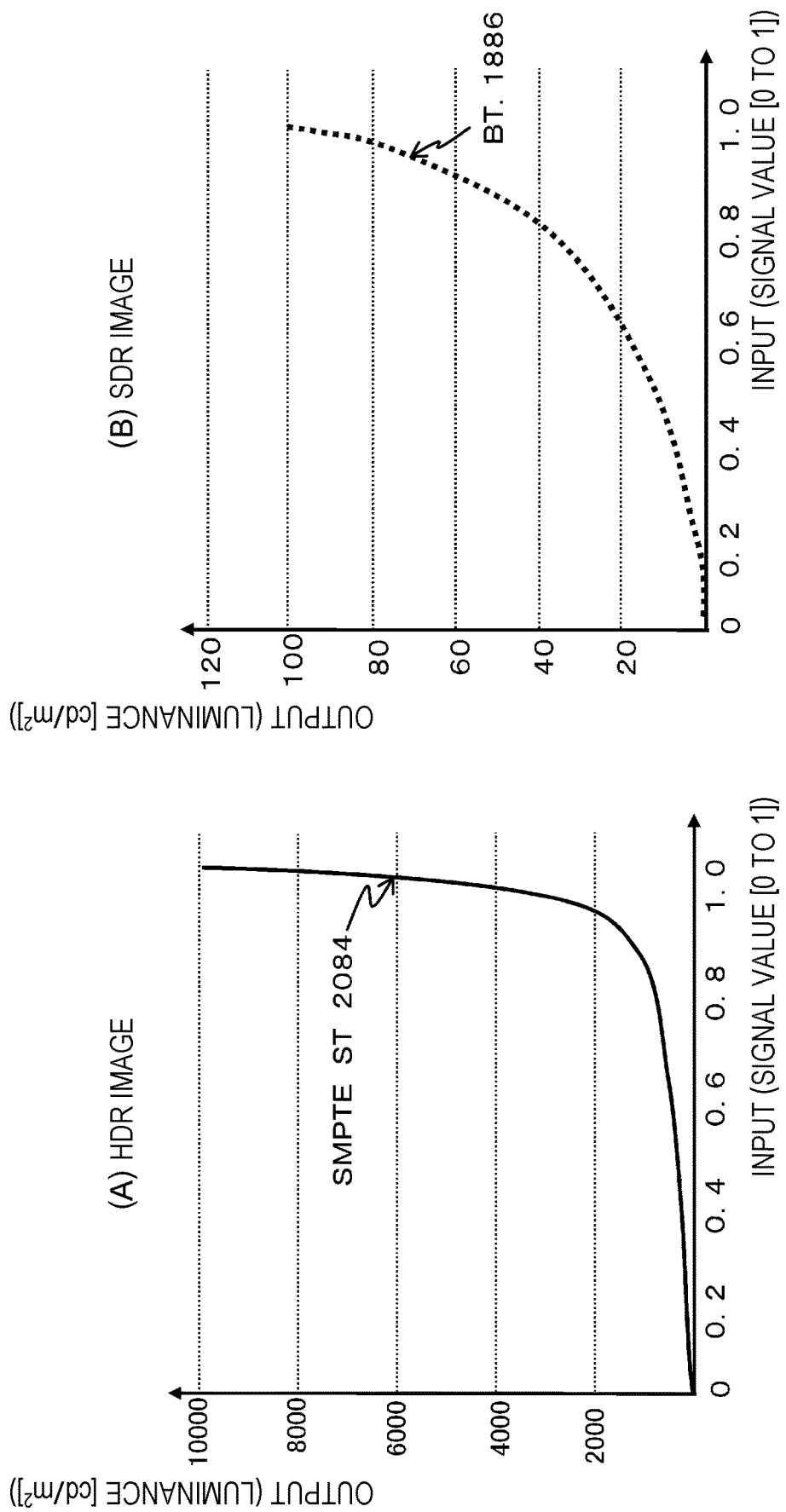
FIG. 2 is a diagram illustrating an example of an input/output characteristic of an HDR image and an SDR image.

FIG. 2 is a graph illustrating a correspondence relationship between a signal value and a display luminance of the HDR image and the SDR image. Each of the following drawings is illustrated.

(A) A graph of a correspondence relationship between an input signal value and an output luminance value of the HDR image (B) A graph of a correspondence relationship between an input signal value and an output luminance value of the SDR image In two graphs illustrated in FIG. 2, a horizontal axis is input (a signal value (0 to 1)), and a vertical axis is output (a luminance (cd/m$^2$)), and the two graphs are a graph illustrating a correspondence relationship between the input (the signal value) and the output (the luminance). The graph is a graph illustrating an electro-optical transfer function (EOTF) of transferring an input electric signal to an output optical signal.

In both of (A) and (B), the horizontal axis is the input signal value. Specifically, for example, the input signal value corresponds to a signal value of each of R, G, and B (for example, 8 bits to 12 bits signal value), and is represented by normalizing a bit signal value to 0 to 1.0.

The vertical axis illustrates a luminance value of a pixel configuring an image to be output onto the display unit.

As illustrated in FIG. 2(B), in the SDR image, output of which a luminance value is 0 to 100 (cd/square m), is obtained with respect to the input signal value (0 to 1).

On the other hand, in the HDR image illustrated in FIG. 2(A), output of which a luminance value is 0 to 10000 (cd/square m), is obtained with respect to the input signal value (0 to 1).

Thus, in the HDR image, an image having a luminance range of approximately 100 times the luminance range of the SDR image, can be output.

This indicates that the HDR image is capable of faithfully outputting an image close to a situation that is actually seen by naked eyes, from dark to bright.

A curve (an EOTF curve) illustrated in the graph of the correspondence relationship between the input signal value and the output luminance value of the HDR image illustrated in FIG. 2(A), is referred to as an SMPTE ST 2084 curve. The curve is a characteristic curve that is one representative of the HDR image, and is a curve specified as a standard of Society of Motion Picture and Television Engineers (SMPTE).

Furthermore, the SMPTE ST 2084 curve is also referred to as a perceptual quantization (PQ) curve.

The SMPTE ST 2084 curve is used for generating coded data corresponding to a dynamic range of a luminance range of 0 cd/square m to 10000 cd/square m, configuring the HDR image. Specifically, the dynamic range of the luminance range, configuring the HDR image, is transferred according to the SMPTE ST 2084 curve defined as a curve of a quantization step matched to the human eyes, and thus, it is possible to generate an image signal within a gradation of a predetermined bit (for example, 10 bits to 12 bits).

On the other hand, a curve (an EOTF curve) illustrated in the graph of the correspondence relationship between the input signal value and the output luminance value of the SDR image illustrated in FIG. 2(B), is referred to as a BT.1886 curve.

The BT.1886 curve is used for generating coded data corresponding to a dynamic range of a luminance range of 0 cd/square m to 100 cd/square m, configuring the SDR image. Specifically, the dynamic range of the luminance range, configuring the SDR image, is transferred according to the BT.1886 curve defined as a curve of a quantization step matched to the human eyes, and thus, it is possible to generate an image signal within a gradation of a predetermined bit (for example, 8 bits to 10 bits).

Figure 3:
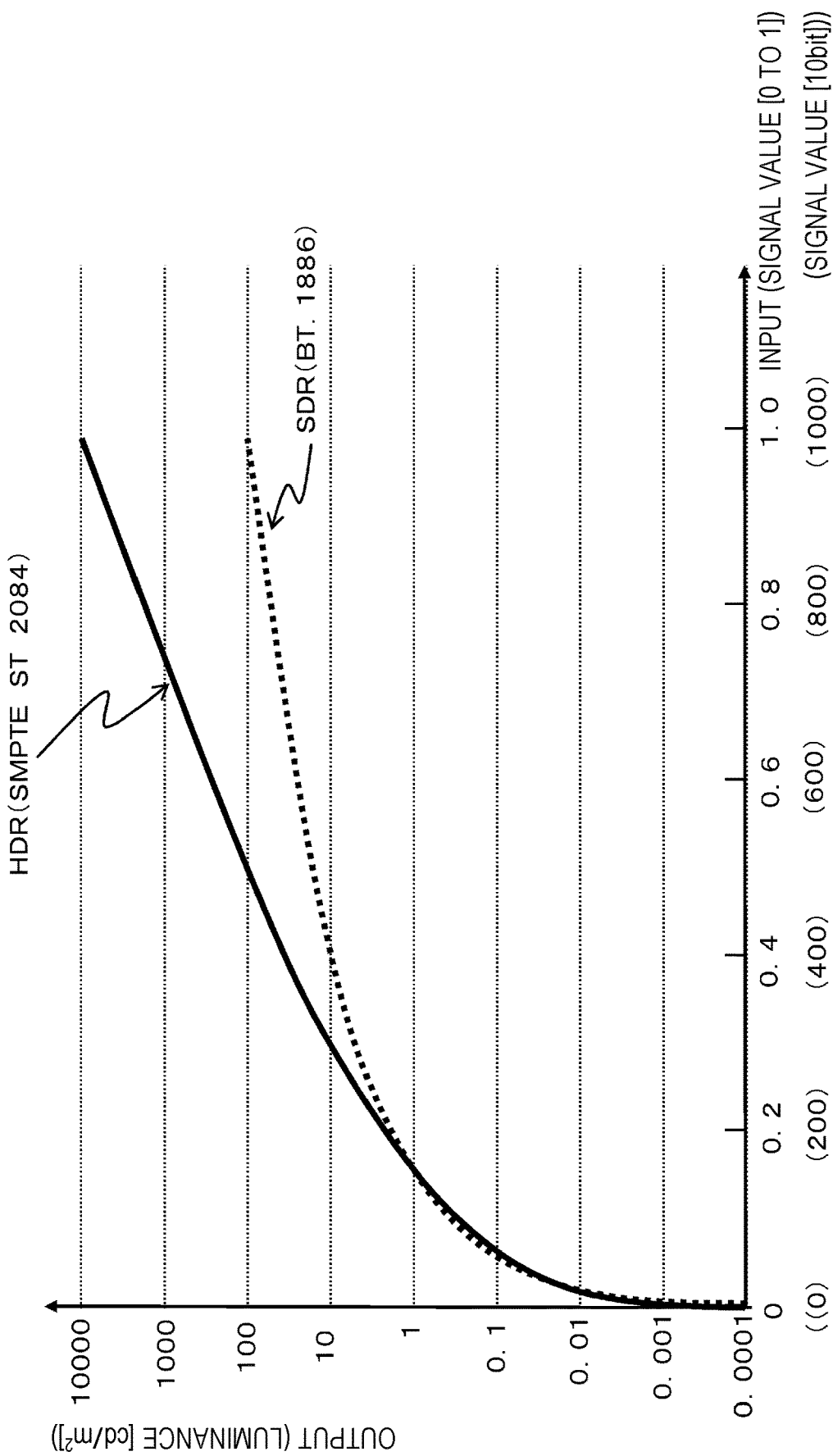
FIG. 3 is a diagram illustrating an example of the input/output characteristic of the HDR image and the SDR image.

In FIG. 3, the SMPTE ST 2084 curve illustrated in FIG. 2(A), the curve being an electro-optical transfer function (EOTF) curve illustrating an input/output characteristic corresponding to the HDR image, and the BT.1886 curve illustrated in FIG. 2(B), the curve being an electro-optical transfer function (EOTF) curve illustrating an input/output characteristic corresponding to the SDR image, are illustrated as one graph.

Furthermore, in the graph illustrated in FIG. 3, a luminance on a vertical axis is set as a log axis.

In the graph illustrated in FIG. 3, a horizontal axis is input (a signal value (0 to 1)), and a vertical axis is output (a luminance ($cd/m^2$)), and the graph is a graph illustrating a correspondence relationship between the input (the signal value) and the output (the luminance). As with FIGS. 2(A) and 2(B), the graph is a graph illustrating an electro-optical transfer function (EOTF) of transferring an input electric signal to an output optical signal.

As illustrated in FIG. 3, for example, in the maximum value of an input signal of 1.0, an output luminance of the SDR image is 100 $cd/m^2$, but an output luminance of the HDR image is 10000 $cd/m^2$, and thus, there is a difference of 100 times in a luminance level.

3. Control Processing of Output Image Based on Difference in Brightness Between Contents Production Environment and Contents Audiovisual Environment Next, an example of image control processing for a difference in a brightness between a contents production environment and a contents audiovisual environment, and image brightness adjustment to be executed in an image processing apparatus (a television) or the like, on the contents audiovisual environment side, will be described with reference to FIG. 4 and the following.

As illustrated in FIG. 4(a), color or luminance adjustment as a production step of SDR image contents and HDR image contents, is executed by displaying image contents on a contents production monitor 21, and by observing the displayed image.

In many cases, the image adjustment processing is executed in a dark room, in order to suppress the influence of the external light.

As illustrated in the contents production environment of FIG. 4(a), the SDR image contents or the HDR image contents are displayed on the contents production monitor 21 provided in the dark room, and the color or the luminance of the image is adjusted while observing the displayed image.

The main reason for performing the adjustment in the dark room, for example, is because in a case where color adjustment or the like is performed in a bright room affected by an illumination such as a fluorescent lamp or an LED, or external light such as solar light, it is difficult to perform accurate adjustment due to the influence of a color component, a luminance, or the like, included in the external light, and accurate adjustment is executed in an environment not affected by the external light.

The contents produced by being subjected to color adjustment or luminance adjustment in the dark room, for example, are stored in a medium such as a BD, and are provided to the user. Alternatively, the contents are transmitted to the display device such as a television of the user, through a broadcasting wave.

FIG. 4(b) is a diagram illustrating an example of a general contents audiovisual environment.

A general contents viewing user, for example, views a television in a living room or the like of a house. The living room is in a bright environment maintained to have a predetermined brightness by an illumination such as a fluorescent lamp or an LED, and external light such as solar light.

In such a bright environment, the contents are displayed on a contents viewing monitor 31 such as a television, and are viewed.

Furthermore, in a processing example described below, the contents viewing monitor 31 is the latest monitor, and is described as a monitor including a display unit capable of outputting a high luminance image of 300 $cd/m^2$ to 1000 $cd/m^2$.

The SDR image or the HDR image is displayed on the contents viewing monitor 31 capable of outputting a high luminance image.

As illustrated in FIG. 4 (a), the displayed contents are contents produced in the dark room, and are an image adjusted to have an optimal color shade and an optimal luminance in a dark environment.

For this reason, in a case where such contents are seen in the bright environment, the entire image may be felt to be dark.

In the contents viewing monitor 31 including a display unit capable of outputting a high luminance image of 300 $cd/m^2$ to 1000 $cd/m^2$, such as a television, it is proposed to perform processing of wholly increasing the luminance of the SDR image contents produced in the dark environment, and of displaying the SDR image contents as a bright SDR image, in order to effectively use a high luminance that can be output from the contents viewing monitor 31.

The processing will be described with reference to FIG. 5 and the following.

Figure 5:
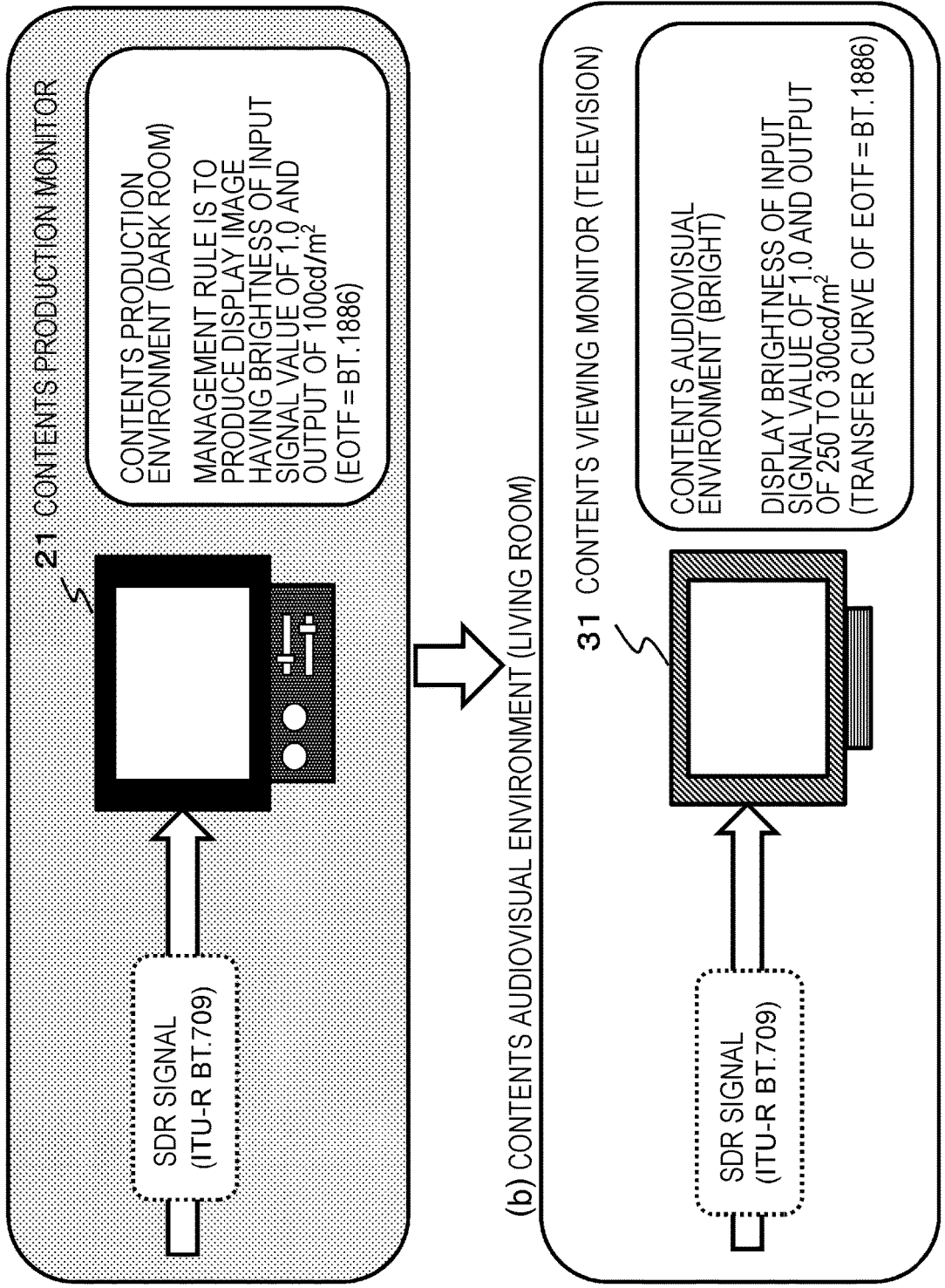
FIG. 5 is a diagram illustrating an example of a contents production environment and an audiovisual environment of the SDR image.

As with FIG. 4, FIG. 5 illustrates each of the following drawings.

(a) Contents Production Environment
(b) Contents Audiovisual Environment (Living Room)

As illustrated in the contents production environment of FIG. 5(a), the SDR image contents are displayed on the contents production monitor 21 provided in the dark room, and the color or the luminance of the image is adjusted while observing the displayed image.

In image adjustment processing with respect to the SDR image, the input/output characteristic is adjusted to be coincident with the input/output characteristic curve (the EOTF curve) corresponding to the SDR image, described above with reference to FIG. 2 and FIG. 3, that is, the BT.1886 curve.

Specifically, as illustrated in FIG. 5(a), in an input signal value of 1.0, which is the maximum value of an input signal of 0 to 1.0, adjustment processing is performed such that a luminance of 100 $cd/m^2$ is output.

However, the adjustment processing is performed in the dark environment, and thus, in a case where the contents are displayed in the bright environment with the input/output characteristic as it is, the entire image may be felt to be dark.

In order to prevent a decrease of the brightness of the image, processing of wholly increasing the luminance of the SDR image contents, is executed in the image processing apparatus on the user side, that is, the contents viewing monitor 31 side, such as a television.

Specifically, as illustrated in FIG. 5(b), the input/output characteristic of the input SDR image, that is, the BT.1886 curve, which is the input/output characteristic curve (the EOTF curve) corresponding to the SDR image described with reference to FIG. 2 and FIG. 3, is transferred, and in the input signal value of 1.0, adjustment is performed such that a luminance of approximately 250 $cd/m^2$ to 300 $cd/m^2$ is output.

That is, the input/output characteristic curve (the EOTF curve) of the input SDR image is transferred, transfer input/output characteristic curves having different input/ output characteristics, are set, and the output value (the luminance) with respect to the input signal (0 to 1.0) is set and is output to the display unit, by using the transfer input/output characteristic curves.

A specific transfer processing example of the input/output characteristic curve (the EOTF curve), will be described with reference to FIG. 6.

Figure 6:
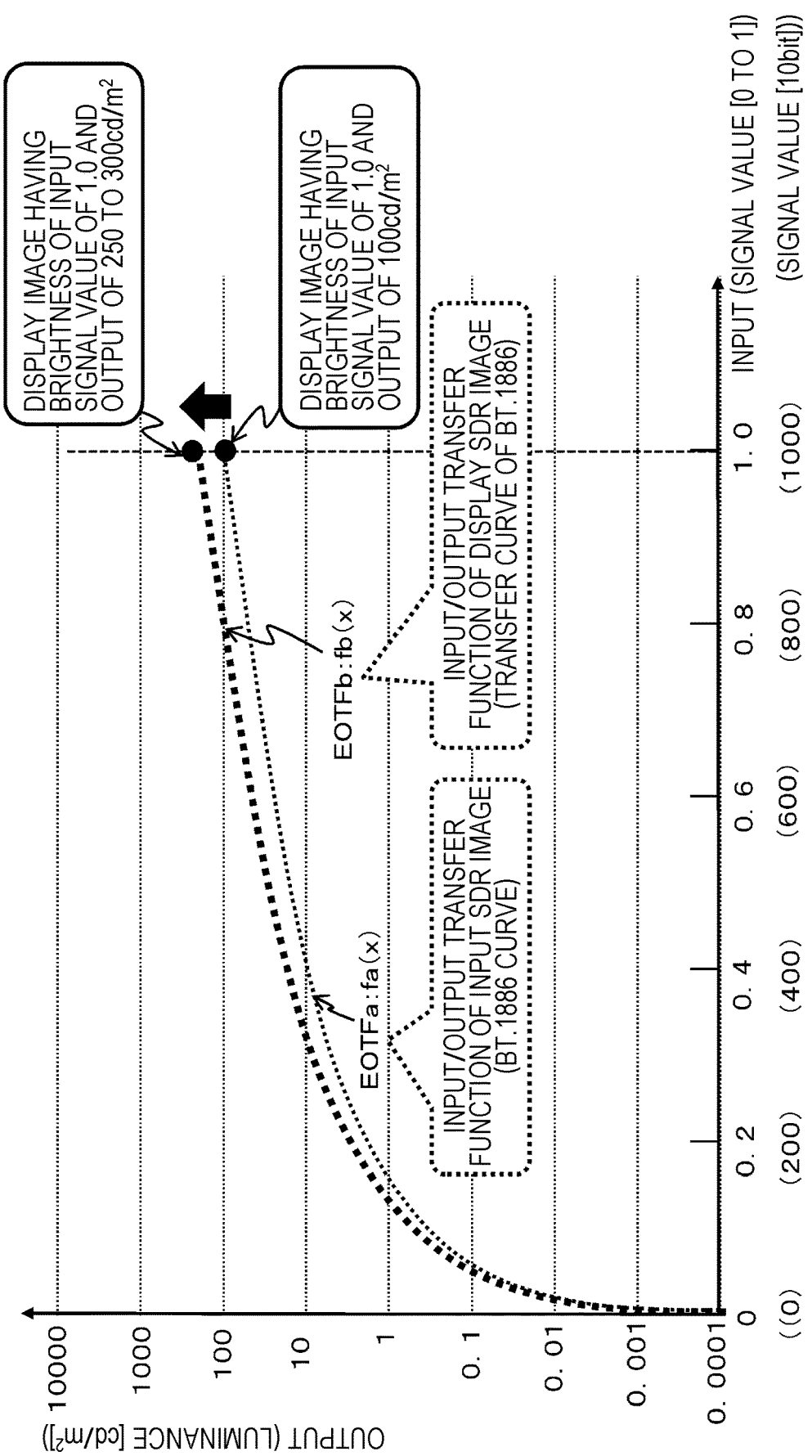
FIG. 6 is a diagram illustrating a transfer processing example of the input/output characteristic of the SDR image.

As described above with reference to FIG. 3, a graph illustrated in FIG. 6, is a graph including a log axis of a luminance ($cd/m^2$) in which a horizontal axis is an input signal value (0 to 1.0), and a vertical axis is an output value.

FIG. 6 illustrates the following two input/output characteristic curves (EOTF curves).

(a) EOTFa:fa(x)
(b) EOTFb:fb(x)

(a) EOTFa:fa(x) is the input/output transfer function of the input SDR image, and is the input/output characteristic of the contents produced in the dark room. That is, EOTFa:fa(x) corresponds to the BT.1886 curve which is the EOTF of the SDR image, described with reference to FIG. 3.

Furthermore, a function fa(x) is a transfer function (EOTFa) for calculating output (a luminance) of y, by using an input signal of x.

EOTFa:fa(x) is set as a function for calculating the output luminance y of 100 $cd/m^2$, in the input signal x of 1.0.

On the other hand, (b) EOTFb:fb(x) is the input/output characteristic of the SDR image for display, generated by input/output characteristic transfer processing that is executed in the contents viewing monitor 31 as the image processing apparatus.

The contents viewing monitor 31 as the image processing apparatus, transfers the input/output transfer function (EOTFa:fa(x)) of the input SDR image, according to a predetermined transfer algorithm, such that the luminance wholly increases. A transfer curve of the BT.1886 curve which is the EOTF of the SDR image, described with reference to FIG. 3, is generated.

According to the transfer processing, a new input/output transfer function (EOTFb:fb (x)) of the SDR image for display is generated.

As illustrated in FIG. 6, the new input/output transfer function (EOTFb:fb(x)) of the SDR image for display, is a function for calculating the output luminance y of 250 $cd/m^2$ to 300 $cd/m^2$, in the input signal x of 1.0.

Thus, the contents viewing monitor 31 as the image processing apparatus, transfers EOTFa:fa(x) of the input SDR image, according to a predetermined transfer algorithm, and thus, generates the transfer function EOTFb:fb (x), having an input/output characteristic of wholly increasing the luminance.

Further, the output (the luminance) corresponding to the input signal x of 0 to 1.0, is calculated by applying the new input/output transfer function (EOTFb:fb (x)), and an image to be displayed on the display unit, is generated.

EOTFb:fb(x) which is the generated new input/output transfer function, is set such that the output (the luminance) is higher than that of EOTFa:fa(x) which is the original input/output transfer function.

That is, a high luminance, that is, a bright pixel value is output with respect to the same input signal value.

In the contents viewing monitor 31 which is the image processing apparatus, that is, for example, in each television of the user, such transfer processing of the input/output characteristic curve is executed, and thus, it is possible to display and view sufficiently bright SDR image contents without feeling the darkness, in the bright audiovisual environment.

The processing executed in the contents viewing monitor 31 which is the image processing apparatus, will be described with reference to FIG. 7.

Figure 7:
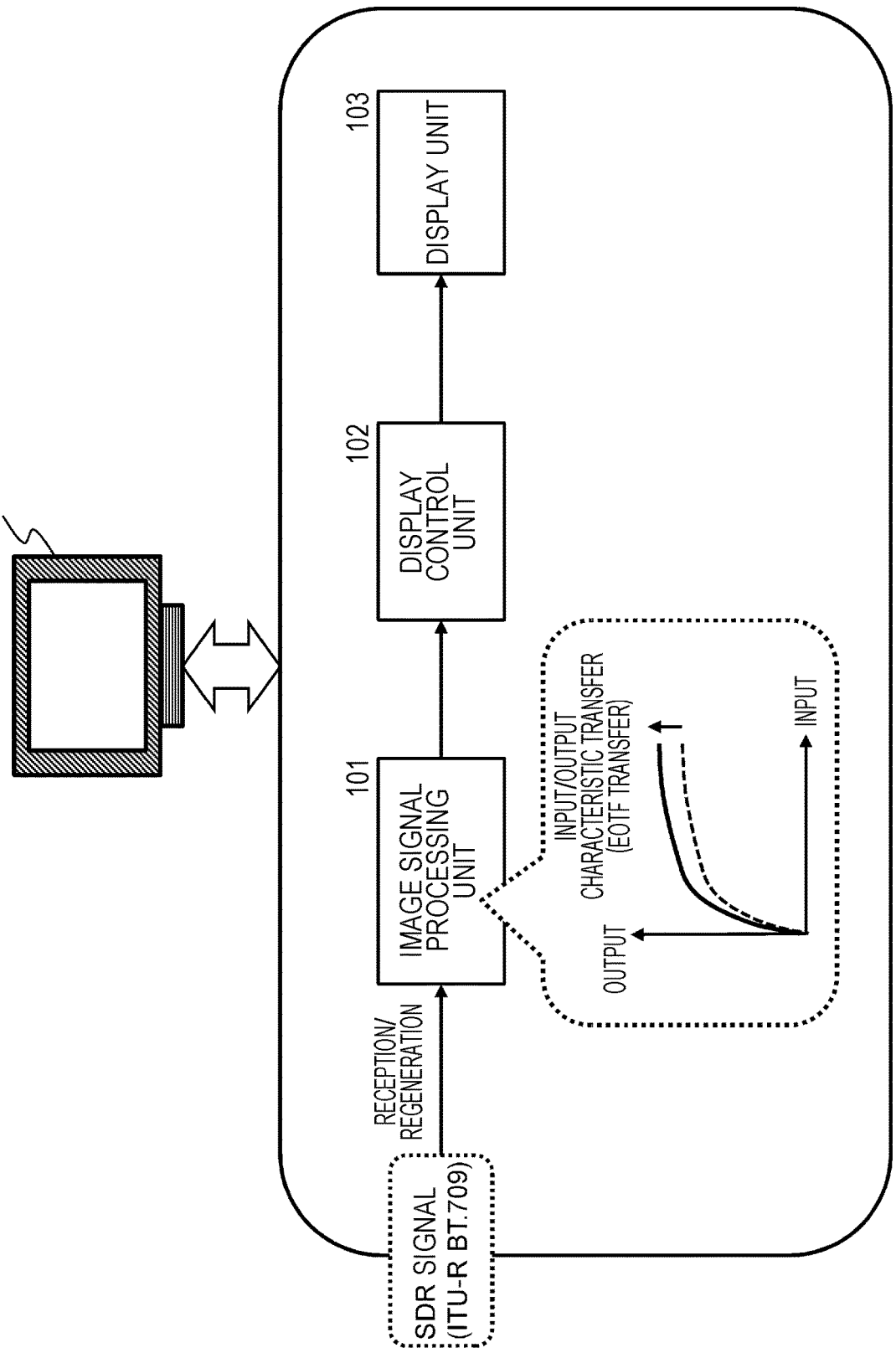
FIG. 7 is a diagram illustrating the configuration and the processing of the image processing apparatus executing the transfer processing of the input/output characteristic of the SDR image.

An image processing apparatus 100 illustrated in FIG. 7, for example, is the contents viewing monitor 31 illustrated in FIG. 5. Furthermore, the image processing apparatus 100 may be other devices, for example, various devices including a display unit, such as a television, a smart phone, and a PC.

The image processing apparatus 100, for example, displays received image data from a broadcasting station, a streaming server, or the like, or regeneration image data from a medium such as a Blu-ray (registered trademark) disc (BD), on a display unit 103.

The image signal processing unit 101, for example, decodes a coded stream input from a broadcasting station or a server, or a medium such as a Blu-ray (registered trademark) disc (BD), and outputs an image signal generated on the basis of the decoded data, to a display control unit 102. For example, an output signal according to a display characteristic of the display unit 103, is generated, and is output to the display control unit 102.

In the image signal processing unit 101, the transfer processing of the input/output characteristic curve (the EOTF curve), described with reference to FIG. 6, is executed.

The image signal processing unit transfers the original input/output characteristic curve of the input SDR image (the EOTF curve), that is, the BT.1886 curve (EOTFa:fa(x) illustrated in FIG. 6), according to a predetermined transfer algorithm, and generates a new input/output transfer function EOTFb:fb(x) for display, having an input/output characteristic of wholly increasing the luminance.

The transfer processing with respect to the input/output transfer function (EOTF), for example, is executed by multiplying a gain function G(x) of setting a gain G according to each of the input signal values (x), and the original input/output characteristic (EOTF) of the input SDR image, together.

Figure 8:
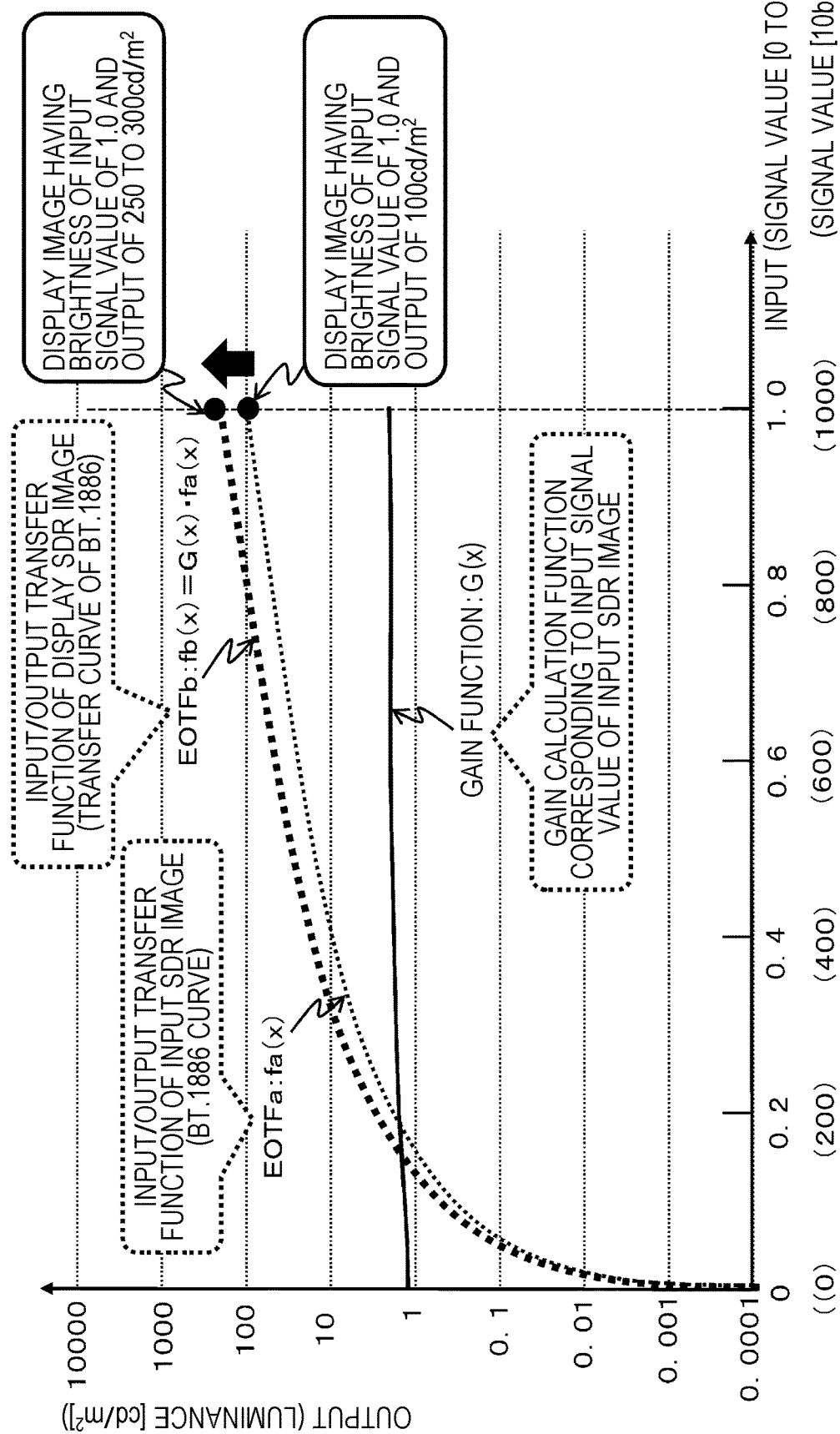
FIG. 8 is a diagram illustrating an example of a gain function to be applied to the transfer processing of the input/output characteristic of the SDR image.

FIG. 8 illustrates an example of the gain function G(x)

The gain function G(x) illustrated in FIG. 8, is a function for specifying a gain value y set in advance according to the input signal value (x).

As illustrated in FIG. 8, in all of the input signal values x of 0 to 1, the gain function G(x) sets the gain value y to be greater than or equal to 1. The gain value y is set in a range of approximately 1 to 5.

The new input/output transfer function EOTFb:fb(x), having an input/output characteristic of wholly increasing the luminance, is calculated by a multiplication expression between the original input/output transfer function EOTFa:fa(x) of the input SDR image, and the gain function G(x), that is, the following expression.

$$fb(x)=G(x) \times fa(x)$$

The gain function G(x) is a value of greater than or equal to 1, in a range of all of the input signal values x of 0 to 1, the luminance of the new input/output transfer function EOTFb:fb(x) to be calculated according to the expression described above, is a value greater than the luminance to which the original transfer function fa(x) is applied.

That is, in all of the input signal values x of 0 to 1, it is possible to generate a bright image of which the output luminance is higher than the luminance calculated by the original transfer function EOTFa:fa(x), by applying the newly calculated transfer function EOTFb:fb(x).

The image signal processing unit 101 illustrated in FIG. 7, for example, changes the original input/output transfer function (EOTFa:fa(x)) of the input SDR image, by using the gain function G(x), generates the new input/output transfer function (EOTFb:fb(x)), and calculates the output pixel value (the luminance) based on the input signal (x) of each of the pixels configuring an image by applying the input/output transfer function (EOTFb:fb(x)).

The display control unit 102 generates output signal with respect to the display unit 103, on the basis of the pixel value calculated by applying the new input/output transfer function (EOTFb:fb(x)) in the image signal processing unit 101.

The display unit 103 drives a display panel by using the input signal from the display control unit 102, and executes image display.

According to such processing, an image brighter than the original input SDR image, is displayed on the display unit 103, and for example, in the case of observing the displayed image of the display unit 103 as contents in a bright living room, it is possible to observe the displayed image as a sufficiently bright image.

4. Problem of Control Processing of Output Image with Respect to HDR Image

As described above, according to the processing of changing the input/output transfer function (EOTF) of the SDR image, produced in the dark room, it is possible to generate and display a bright SDR image optimal for viewing in a bright living room environment.

However, in the case of applying processing similar to the processing described above, to the HDR image in a high dynamic range, a problem occurs. Hereinafter, the problem will be described.

Figure 9:
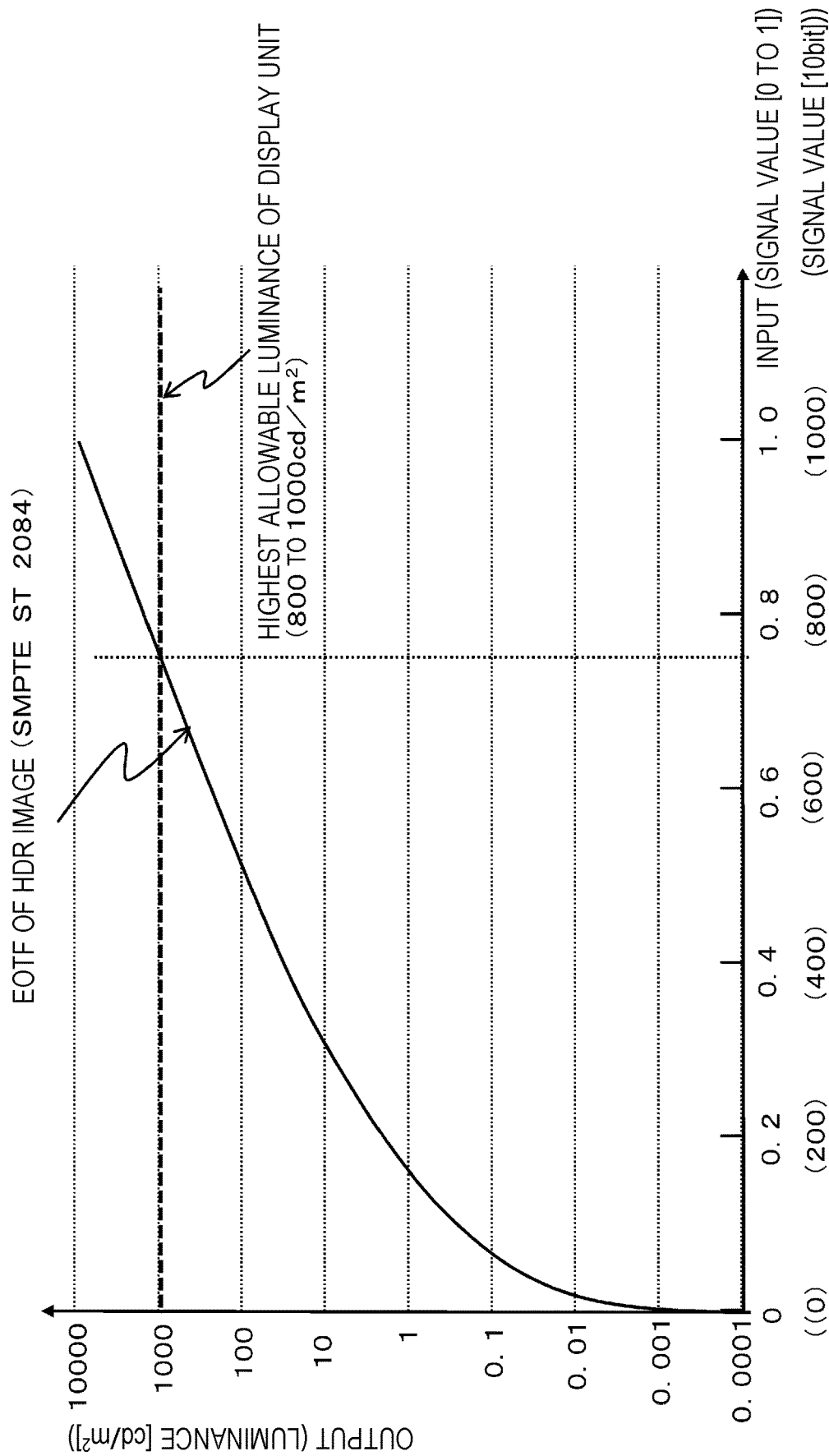
FIG. 9 is a diagram illustrating an example of the input/output characteristic of the HDR image.

FIG. 9 illustrates the SMPTE ST 2084 curve which is the input/output transfer function (EOTF) curve indicating the input/output characteristic of the HDR image, described above with reference to FIG. 3.

FIG. 9 is a log axis in which a horizontal axis is input (a signal value (0 to 1)), and a vertical axis is output (a luminance ($cd/m^2$)), and is a graph illustrating a correspondence relationship between the input (the signal value) and the output (the luminance).

As described above, the HDR image is image data capable of outputting a luminance range of approximately 0 $cd/m^2$ to 10000 $cd/m^2$, and as illustrated in FIG. 9, in the input signal of 1.0, the luminance is set to 10000 $cd/m^2$.

However, as described above, in an HDR corresponding television assumed to be popular in the future, the output maximum luminance is approximately 500 $cd/m^2$ to 1000 $cd/m^2$, and the luminance of 10000 $cd/m^2$ is not capable of being output.

In an example illustrated in FIG. 9, the highest allowable luminance of the display unit is illustrated as 1000 $cd/m^2$, as an example.

As with the production environment of the SDR image described above, the HDR image is usually produced in dark room not affected by the external light, as a production environment of the HDR image.

An example of a production environment and an audio visual environment of the HDR image contents will be described with reference to FIG. 10.

Figure 10:
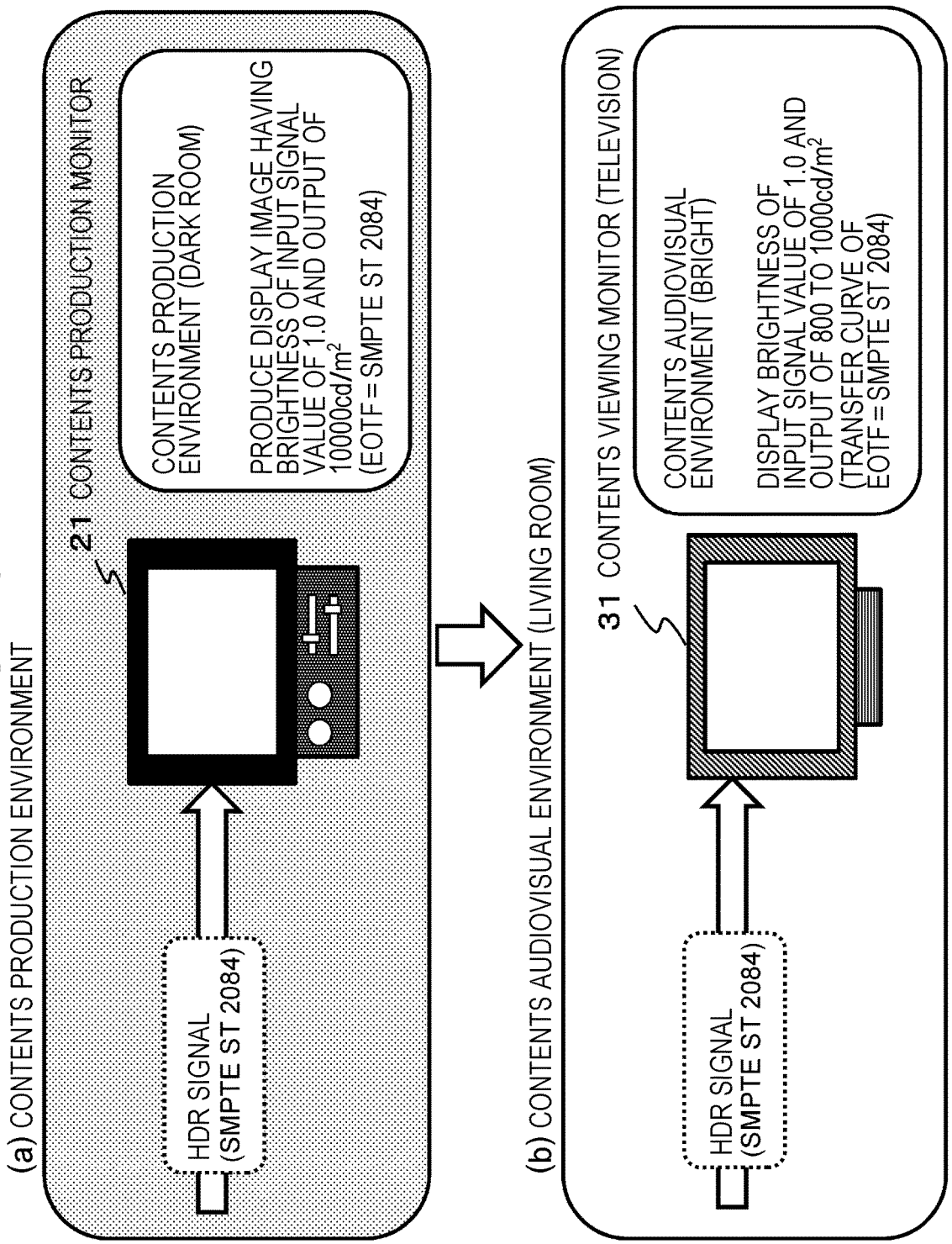
FIG. 10 is a diagram illustrating an example of a contents production environment and an audiovisual environment of the HDR image.

FIG. 10 illustrates each of the following drawings with respect to the HDR image, as with the production environment and the audiovisual environment of the SDR image, described above with reference to FIG. 5.

(a) Contents Production Environment (b) Contents Audiovisual Environment (Living Room)

As illustrated in the contents production environment of FIG. 10(a), the HDR image contents are displayed on the contents production monitor 21 provided in the dark room, and the color or the luminance of the image is adjusted while observing the displayed image.

In the image adjustment processing with respect to the HDR image, the input/output characteristic is adjusted to be coincident with the input/output characteristic curve (the EOTF curve) corresponding to the HDR image, illustrated in FIG. 9, that is, the SMPTE ST 2084 curve.

Specifically, as illustrated in FIG. 10(a), in the input signal value of 1.0, which is the maximum value of the input signal of 0 to 1.0, the adjustment processing is performed such that a luminance of 10000 $cd/m^2$ is output.

However, the luminance of 10000 $cd/m^2$ is not capable of being output in the contents viewing monitor (the television) 31 in the contents audiovisual environment of FIG. 10(b).

Accordingly, it is necessary to adjust the output pixel value (the luminance), in the image processing apparatus on the user side, that is, the contents viewing monitor 31 side, such as a television.

In the luminance adjustment processing of the SDR image, described above with reference to FIG. 6, the luminance of the input signal x of 1.0, is adjusted to be brighter, and thus, it is possible to generate display contents brighter than that at the time of producing the contents.

However, in the HDR image, the luminance of the input signal x of 1.0 is 10000 $cd/m^2$, and is not capable of being output in the image processing apparatus on the user side, that is, the contents viewing monitor 31 such as a television, and thus, it is necessary to decrease the luminance of the input signal x of 1.0, to the highest luminance level (1000 $cd/m^2$) that can be output from the display unit.

That is, in the image processing apparatus on the user side, that is, the contents viewing monitor 31 such as a television, the input/output characteristic curve (the EOTF curve) of the input HDR image is transferred, transfer input/output characteristic curves having different input/output characteristics, are set, and the output value (the luminance) with respect to the input signal (0 to 1.0) is set and is output to the display unit, by using the transfer input/output characteristic curves.

A specific transfer processing example of the input/output characteristic curve (the EOTF curve) will be described with reference to FIG. 11.

Figure 11:
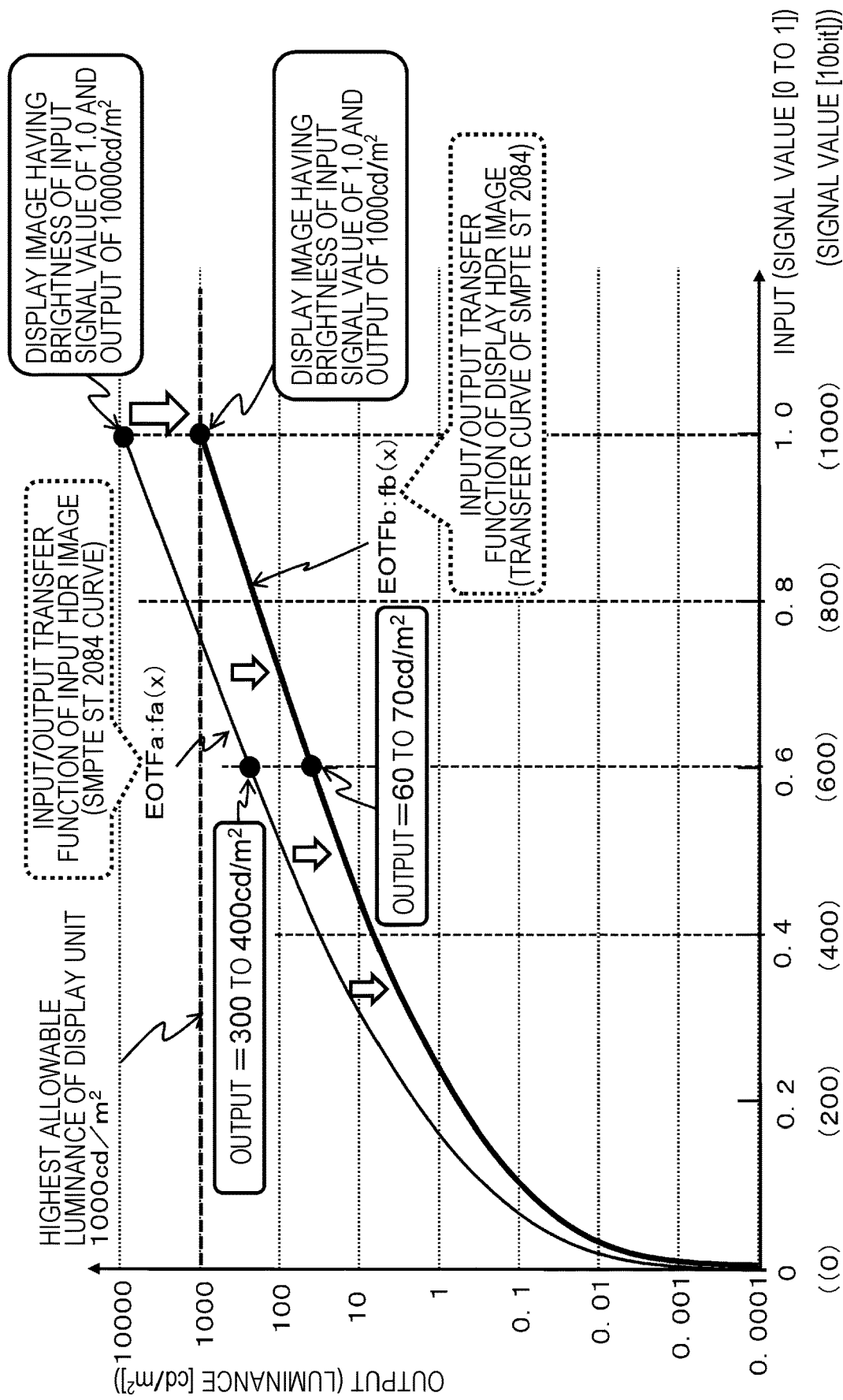
FIG. 11 is a diagram illustrating a problem in transfer processing of the input/output characteristic of the HDR image.

As described above with reference to FIG. 9, a graph illustrated in FIG. 11, is a graph including a log axis of a luminance ($cd/m^2$) in which a horizontal axis is an input signal value (0 to 1.0), and a vertical axis is an output value.

FIG. 11 illustrates the following two input/output characteristic curves (EOTF curves).

(a) EOTFa:fa(x)

(b) EOTFb:fb(x)

(a) EOTFa:fa(x) is the original input/output transfer function of the input HDR image, and is the input/output characteristic of the contents produced in the dark room. That is, EOTFa:fa(x) corresponds to the SMPTE ST 2084 curve which is the input/output transfer function (EOTF) of the HDR image, described with reference to FIG. 9.

Furthermore, a function fa(x) is a transfer function (EOTFa) for calculating output (a luminance) of y, by using an input signal of x.

The original input/output transfer function (EOTFa:fa(x)) of the input HDR image, is a function for calculating an output luminance y of 10000 $cd/m^2$ in the input signal x of 1.0.

On the other hand, (b) EOTFb:fb(x) is an input/output transfer function indicating the input/output characteristic of the HDR image for display, generated by the input/output characteristic transfer processing that is executed in the contents viewing monitor 31 as the image processing apparatus.

The contents viewing monitor 31 as the image processing apparatus, transfers the original input/output transfer function (EOTFa:fa(x)) of the input HDR image, according to a predetermined transfer algorithm, and transfers the input/output characteristic such that the output luminance is set to be less than or equal to the highest luminance that can be displayed on the display unit.

A new input/output transfer function (EOTFb:fb(x)) of the HDR image for display, generated by the transfer processing, for example, as illustrated, is set as a function for calculating the output luminance y of 1000 $cd/m^2$, in the input signal x of 1.0.

According to the transfer processing, it is possible to decrease the maximum output luminance y of 10000 $cd/m^2$ of the original input/output transfer function (EOTFa:fa(x)), to the highest luminance y of 1000 $cd/m^2$ that can be displayed on the display unit.

In the new input/output transfer function (EOTFb: fb (x)) of the HDR image for display, the output luminance y of 1000 $cd/m^2$ is output in the input signal x of 1.0, and images of different gradations corresponding to all of the input signals, can be displayed to the input signal value x of 0 to 1.0.

However, in all of the input signals x of 0 to 1.0, EOTFb:fb(x) which is the generated new input/output transfer function, illustrated in FIG. 11, is set to the output luminance lower than the output luminance of EOTFa:fa(x) which is the original input/output transfer function.

For example, in the case of the input signal x of 0.6, the output luminance of EOTFa:fa(x) which is the original input/output transfer function, is approximately 300 $cd/m^2$ to 400 $cd/m^2$, but the output luminance of EOTFb:fb(x) which is the generated new input/output transfer function, decreases to approximately 60 $cd/m^2$ to 70 $cd/m^2$.

Thus, in all of the input signals x of 0 to 1.0, the generated new input/output transfer function (EOTFb:fb(x)) of the HDR image for display, illustrated in FIG. 11, is the output luminance lower than the output luminance of EOTFa:fa(x) which is the original input/output transfer function, and as a result thereof, a problem that the entire image becomes dark, occurs.

5. Configuration of Realizing Display of Bright HDR Image by Preventing Decrease in Luminance of HDR Image Next, a configuration for solving the problem described above, that is, a configuration for realizing the display of a bright HDR image by preventing a decrease in the luminance of the HDR image, will be described.

The configuration for realizing the display of a bright HDR image, will described with reference to FIG. 12 and the following.

Figure 12:
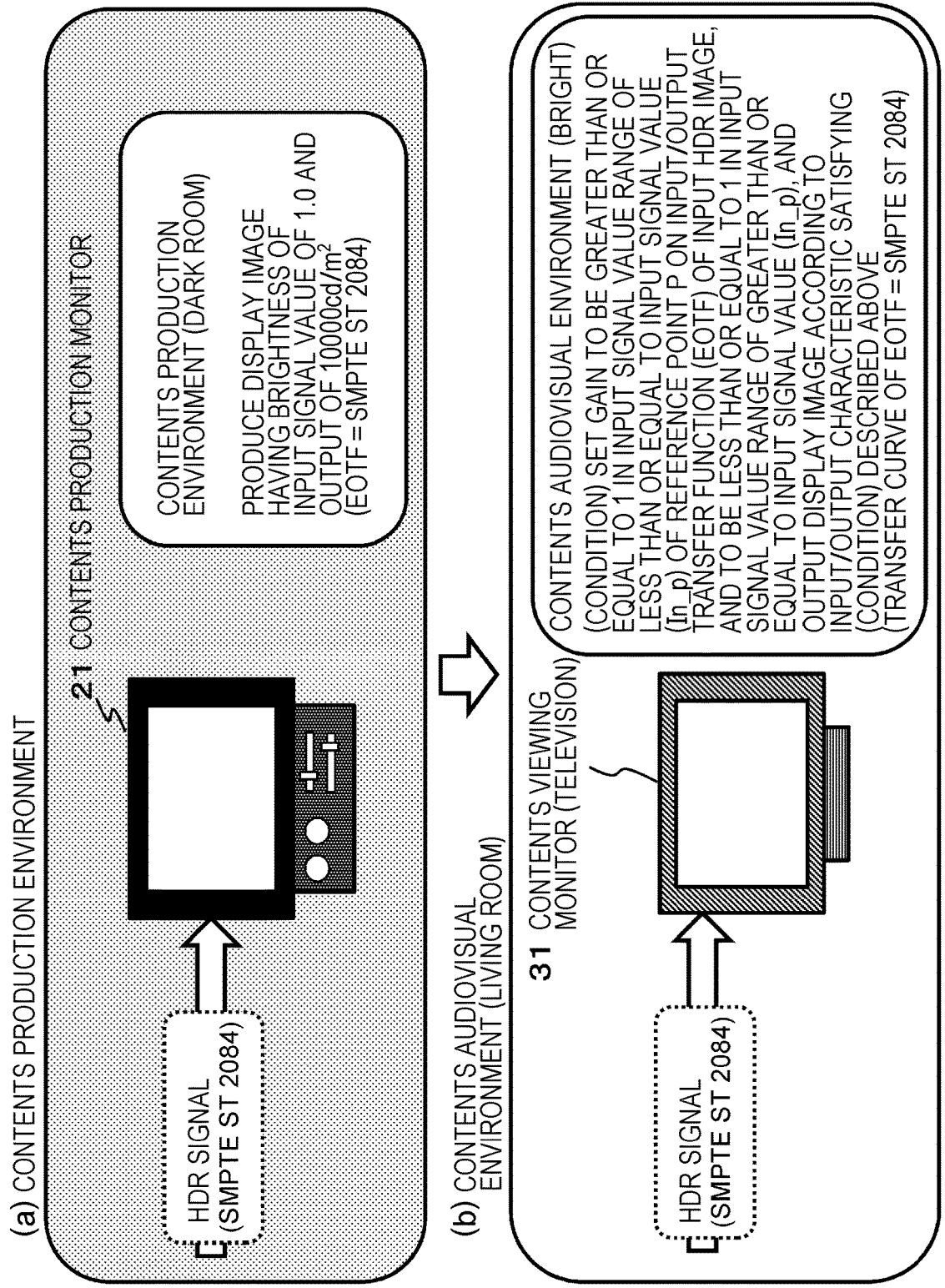
FIG. 12 is a diagram illustrating an example of the transfer processing of the input/output characteristic of the HDR image, to be executed by the image processing apparatus of the present disclosure.

FIG. 12 is a diagram illustrating the production environment and the audiovisual environment of the HDR image, as described above with reference to FIG. 10, and illustrates each of the following drawings.
(a) Contents Production Environment
(b) Contents Audiovisual Environment (Living Room)
As illustrated in the contents production environment of FIG. 12(a), the HDR image contents are displayed on the contents production monitor 21 provided in the dark room, and the color or the luminance of the image is adjusted while observing the displayed image.

The image adjustment processing with respect to the HDR image, is performed such that the input/output characteristic is coincident with the input/output characteristic curve (the EOTF curve) corresponding to the HDR image, illustrated in FIG. 9, that is, the SMPTE ST 2084 curve.

Specifically, as illustrated in FIG. 12(a), in the input signal value of 1.0, which is the maximum value of the input signal of 0 to 1.0, adjustment processing is performed such that a luminance of 10000 $cd/m^2$ is output.

However, the luminance of 10000 $cd/m^2$ is not capable of being output in the contents viewing monitor (the television) 31 in the contents audiovisual environment of the FIG. 10(b).

Accordingly, it is necessary to adjust the output pixel value (the luminance), in the image processing apparatus on the user side, that is, the contents viewing monitor 31 side, such as a television.

In the image processing apparatus on the user side, that is, the contents viewing monitor 31 such as a television, the processing of changing the input/output characteristic curve (the EOTF curve) of the input HDR image, is performed, and the processing is performed in setting of satisfying (Condition) described below.

(Condition) The gain function G(x) of setting a gain to be greater than or equal to 1 in an input signal value range of less than or equal to an input signal value (In_p) of a reference point P on the input/output transfer function (EOTF) of the input HDR image, and to be less than or equal to 1 in an input signal value range of greater than or equal to the input signal value (In_p), is applied to the input/output transfer function (EOTFa:fa(x)) of the input HDR image, and a display image is generated.

A new input/output transfer function (EOTF) is set by the processing satisfying (Condition) described above, and the input/output transfer processing according to the new input/output transfer function (EOTF) is executed, and thus, a display image is generated and output.

A specific transfer processing example of the input/output characteristic curve (the EOTF curve) will be described with reference to FIG. 13.

Figure 13:
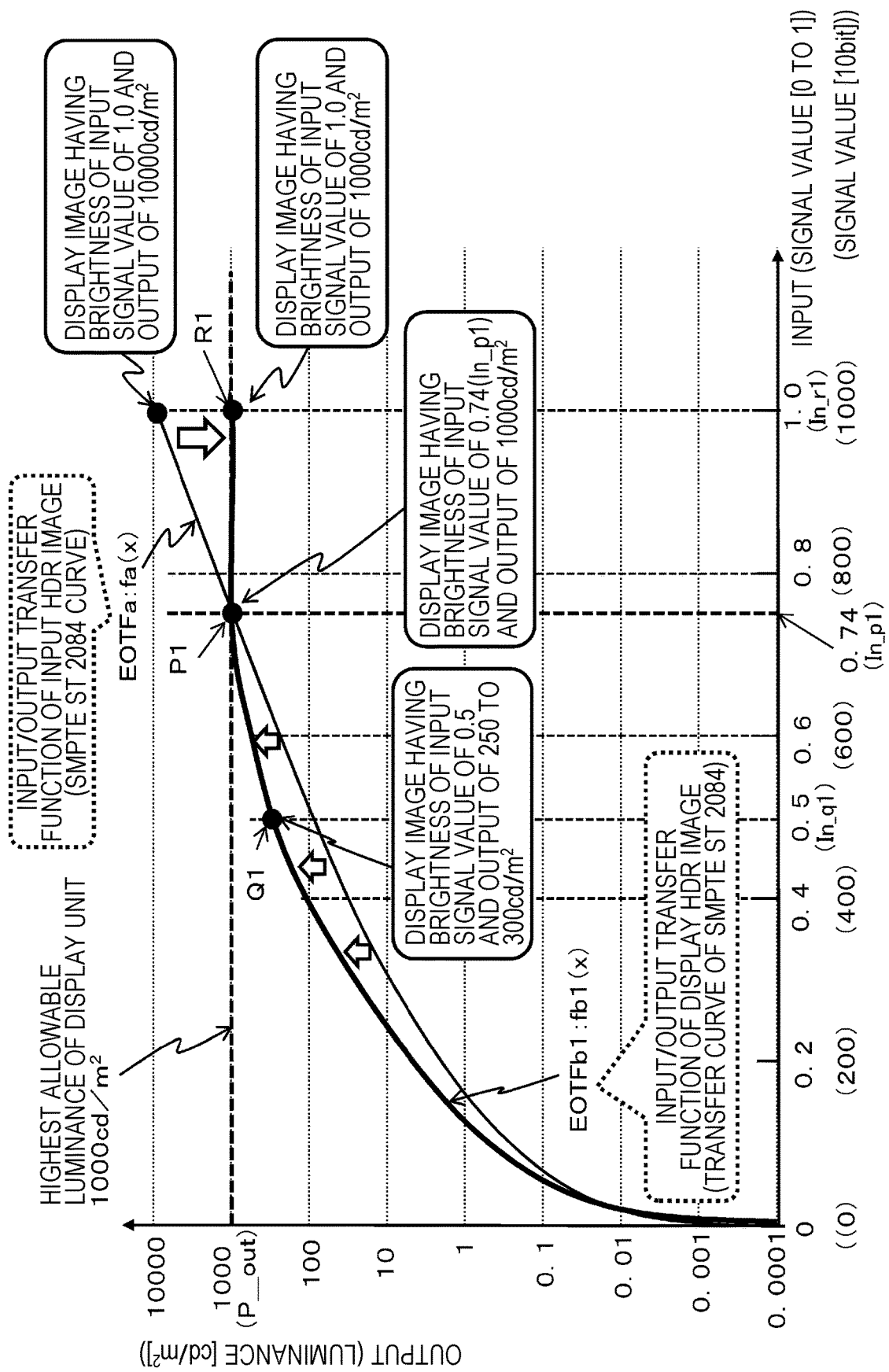
FIG. 13 is a diagram illustrating an example of the transfer processing of the input/output characteristic of the HDR image, to be executed by the image processing apparatus of the present disclosure.

As described with reference to FIG. 9 or FIG. 11, a graph illustrated in FIG. 13, is a graph including a log axis of a luminance ($cd/m^2$) in which a horizontal axis is an input signal value (0 to 1.0), and a vertical axis is an output value.

FIG. 13 illustrates the following two input/output characteristic curves (EOTF curves).
(a) EOTFa:fa(x)
(b) EOTFb1:fb1(x)
(a) EOTFa:fa(x) is the input/output transfer function of the input HDR image, and is the input/output characteristic of the contents produced in the dark room. That is, EOTFa:fa(x) corresponds to the SMPTE ST 2084 curve which is the EOTF of the HDR image, described with reference to FIG. 9.

Furthermore, a function fa(x) is a transfer function (EOTFa) for calculating output (a luminance) of y, by using an input signal of x.

EOTFa:fa(x) is set as a function for calculating an output luminance y of 10000 $cd/m^2$ in the input signal x of 1.0.

On the other hand, (b) EOTFb1:fb1(x) is an input/output transfer function indicating new input/output characteristic of the HDR image for display, generated by the input/output characteristic transfer processing that is executed in the contents viewing monitor 31 as the image processing apparatus.

The contents viewing monitor 31 as the image processing apparatus, transfers the original input/output transfer function (EOTFa:fa(x)) of the input HDR image, according to a predetermined transfer algorithm, and sets the output luminance to be less than or equal to the highest luminance that can be displayed on the display unit, and transfers the input/output characteristic such that the brightness of the image does not decrease.

In FIG. 13, the curve illustrated as EOTFb1:fb1(x), is the new input/output transfer function of the HDR image for display, generated on the basis of the SMPTE ST 2084 curve, the new input/output transfer function being the original input/output transfer function (EOTFa:fa(x)) of the input HDR image, that is, a transfer curve of the SMPTE ST 2084 curve.

As illustrated, EOTFb1:fb1(x) is set as an input/output transfer function satisfying the following condition.

(Condition) The gain function G(x) of setting a gain to be greater than or equal to 1 in an input signal value range (an input signal of 0 to 0.74) where a reference point P1 on the input/output transfer function (EOTFa:fa(x)) of the input HDR image is less than or equal to an input signal value (In_p1=0.74), and to be less than or equal to 1 in an input signal value range (an input signal of 0.74 to 1.0) where the reference point P1 is greater than or equal to the input signal value (In_p1=0.74), is applied to the input/output transfer function (EOTFa:fa(x)) of the input HDR image, and thus, a display image is generated.

In the contents viewing monitor 31 which is the image processing apparatus, that is, for example, each of television of the user, such transfer processing of the input/output characteristic curve is executed, and thus, in the case of performing viewing in a bright environment, it is possible to display and view sufficiently bright HDR image contents.

The new input/output transfer function (EOTFb1: (fb1)) for a display image, illustrated in FIG. 13, is a curve satisfying (Condition) described above.

Furthermore, in an example illustrated in FIG. 13, the reference point P1 on the input/output transfer function (EOTFa:fa(x)) of the input HDR image is set on an intersection between a curve of the input/output transfer function (EOTFa:fa(x)) (an SMPTE-ST 2084 curve) and the highest allowable luminance (1000 cd/m²) of the display unit.

The gain is set to be greater than or equal to 1 in the input signal value range (the input signal of 0 to 0.74) where the reference point P1 on the input/output transfer function (EOTFa:fa(x)) of the input HDR image is less than or equal to the input signal value (In_p1=0.74), and thus, the output of the input signal value of 0 to 0.74, is set such that the luminance is higher than that of the original OETF:fa(x) corresponding to the input HDR image, that is, the brightness increases.

For example, a point Q1 illustrated in FIG. 13, indicates an output point of EOTFb:fb(x) after transfer, corresponding to the input signal value of 0.5 (In_q1), and an output luminance of Q1 is approximately 250 cd/m² to 300 cd/m².

The output (the luminance) increases, compared to an output luminance (approximately 100 cd/m²) in the input signal value of 0.5 (In_q1) of the original OETF:fa(x) corresponding to the original input HDR image.

On the other hand, the gain is set to be less than or equal to 1 in the input signal value range (the input signal of 0.74 to 1.0) where the reference point P1 on the input/output transfer function (EOTFa:fa(x)) of the input HDR image is greater than or equal to the input signal value (In_p1=0.74), and thus, the output of the input signal value of 0.74 to 1.0, is a luminance lower than that of the original OETF:fa(x) corresponding to the input HDR image.

Furthermore, in such a range, that is, the range of the input signal value of 0.74 to 1.0, all of the output luminances are set to the highest allowable luminance (1000 cd/m²) of the display unit, by OETFb1:fb1(x) after transfer.

For example, a point R1 illustrated in FIG. 13, indicates an output point of EOTFb1:fb1 (x) after transfer, corresponding to the input signal value of 1.0 (In_r1), and an output luminance of R1 is the highest allowable luminance (1000 cd/m²) of the display unit.

Thus, the contents viewing monitor 31 which is the image processing apparatus, that is, for example, each television of the user, sets the input/output transfer function (EOTFa:fa(x)) of the input HDR image to satisfy (Condition) described above, generates the new input/output transfer function (EOTFb1:fb1(x)) of the HDR image for display, and calculates the output pixel value (the luminance) corresponding to the input signal value of 0 to 1.0 to be displayed on the display unit, by applying the generated input/output transfer function (EOTFb1:fb1(x)).

Such transfer processing of the input/output characteristic curve is executed, and thus, a luminance of a pixel having the highest allowable luminance of the display unit of less than or equal to 1000 cd/m², is set to be higher than a luminance value of the original pixel of the original input HDR image. With this arrangement, in the case of performing viewing in a bright environment, it is possible to display and view sufficiently bright HDR image contents.

Furthermore, the example of FIG. 13, is an example using a display unit of which the highest allowable luminance of the display unit is 1000 cd/m². In the case of other devices having the highest allowable luminance of the display unit, the reference point P is set according to the highest allowable luminance of the display unit of the device.

A processing example in the case of using a display unit having the highest allowable luminance of the display unit of 800 cd/m², will be described with reference to FIG. 14.

Figure 14:
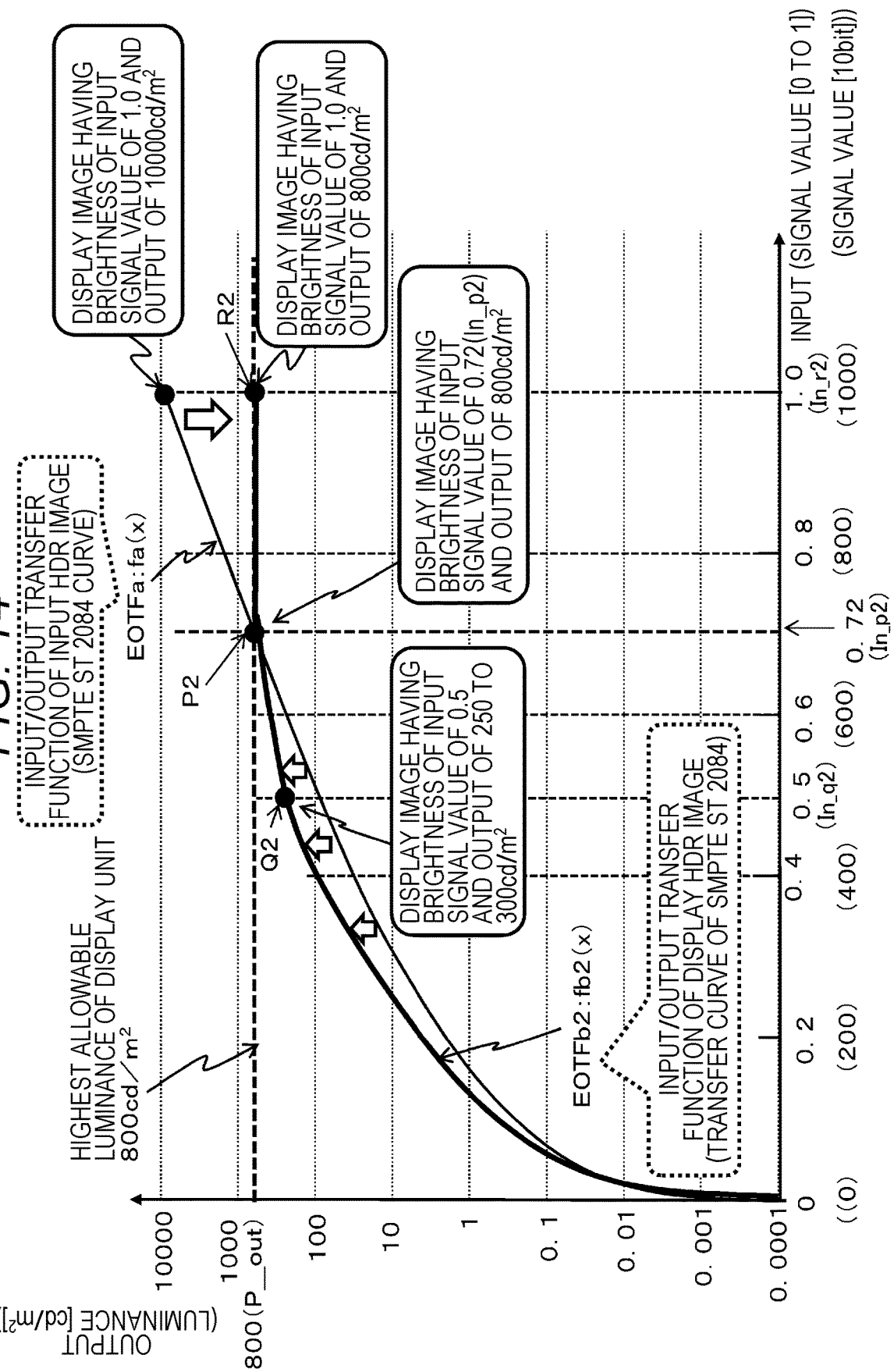
FIG. 14 is a diagram illustrating an example of the transfer processing of the input/output characteristic of the HDR image, to be executed by the image processing apparatus of the present disclosure.

As with FIG. 13, a graph illustrated in FIG. 14, is also a graph including a log axis of a luminance (cd/m²) in which a horizontal axis is an input signal value (0 to 1.0), and a vertical axis is an output value.

FIG. 14 illustrates the following two input/output characteristic curves (EOTF curves).

(a) EOTFa:fa(x)
(b) EOTFb2:fb2(x)

(a) EOTFa:fa(x) is the input/output transfer function of the input HDR image, and is the input/output characteristic of the contents produced in the dark room. That is, EOTFa:fa(x) corresponds to the SMPTE ST 2084 curve which is the EOTF of the HDR image, described with reference to FIG. 9.

EOTFa:fa(x) is set as a function for calculating an output luminance y of 10000 cd/m² in the input signal x of 1.0.

On the other hand, (b) EOTFb2:fb2(x) is a new input/output characteristic of the HDR image for display, generated by the input/output characteristic transfer processing that is executed in the contents viewing monitor 31 as the image processing apparatus.

As illustrated, EOTFb2:fb2(x) is set as an input/output transfer function satisfying the following condition.

(Condition) The gain function G(x) of setting a gain to be greater than or equal to 1 in an input signal value range (an input signal of 0 to 0.72) where a reference point P2 on the input/output transfer function (EOTFa:fa(x)) of the input HDR image is less than or equal to an input signal value (In_p2=0.72), and to be less than or equal to 1 in an input signal value range (an input signal of 0.72 to 1.0) where the reference point P2 is greater than or equal to the input signal value (In_p2=0.72), is applied to the input/output transfer function (EOTFa:fa(x)) of the input HDR image, and thus, a display image is generated.

In an example illustrated in FIG. 14, the highest allowable luminance of the display unit is 800 cd/m$^2$, the reference point P2 on the input/output transfer function (EOTFa:fa(x)) of the input HDR image, is set on an intersection between a curve (the SMPTE-ST 2084 curve) of the input/output transfer function (EOTFa:fa(x)) and the highest allowable luminance (800 cd/m) of the display unit.

The gain is set to be greater than or equal to 1 in the input signal value range (the input signal of 0 to 0.72) where the reference point P2 on the input/output transfer function (EOTFa:fa(x)) of the input HDR image is less than or equal to the input signal value (In_p2=0.72), and thus, the output of the input signal value of 0 to 0.72, is set such that the luminance is higher than that of the original OETF:fa(x) corresponding to the input HDR image, that is, the brightness increases.

For example, a point Q2 illustrated in FIG. 14, indicates an output point of EOTFb2:fb2 (x) after transfer, corresponding to the input signal value of 0.5 (In_q2), and an output luminance of Q2 is approximately 250 cd/m$^2$ to 300 cd/m$^2$.

The output (the luminance) increases, compared to the output luminance (approximately 100 cd/m$^2$) in the input signal value of 0.5 (In_q2) of the original OETF:fa(x) corresponding to the original input HDR image.

On the other hand, the gain is set to be less than or equal to 1 in the input signal value range (the input signal of 0.72 to 1.0) where the reference point P2 on the input/output transfer function (EOTFa:fa(x)) of the input HDR image is greater than or equal to the input signal value (In_p2=0.72), the output of the input signal value of 0.72 to 1.0, is a luminance lower than that of the original OETF:fa(x) corresponding to the input HDR image.

Furthermore, in such a range, that is, the range of the input signal value of 0.72 to 1.0, all of the output luminances are set to the highest allowable luminance (800 cd/m$^2$) of the display unit, by OETFb2:fb2(x) after transfer.

For example, a point R2 illustrated in FIG. 14, indicates an output point of EOTFb2:fb2 (x) after transfer, corresponding to the input signal value of 1.0 (In_r2), and an output luminance of R2 is the highest allowable luminance (800 cd/m$^2$) of the display unit.

Such transfer processing of the input/output characteristic curve is executed, and thus, a luminance of a pixel having the highest allowable luminance of the display unit of less than or equal to 800 cd/m$^2$, is set to be higher than a luminance value of the original pixel of the original input HDR image. With this arrangement, in the case of performing viewing in a bright environment, it is possible to display and view sufficiently bright HDR image contents.

Processing executed in the contents viewing monitor 31 which is the image processing apparatus, will be described with reference to FIG. 15.

Figure 15:
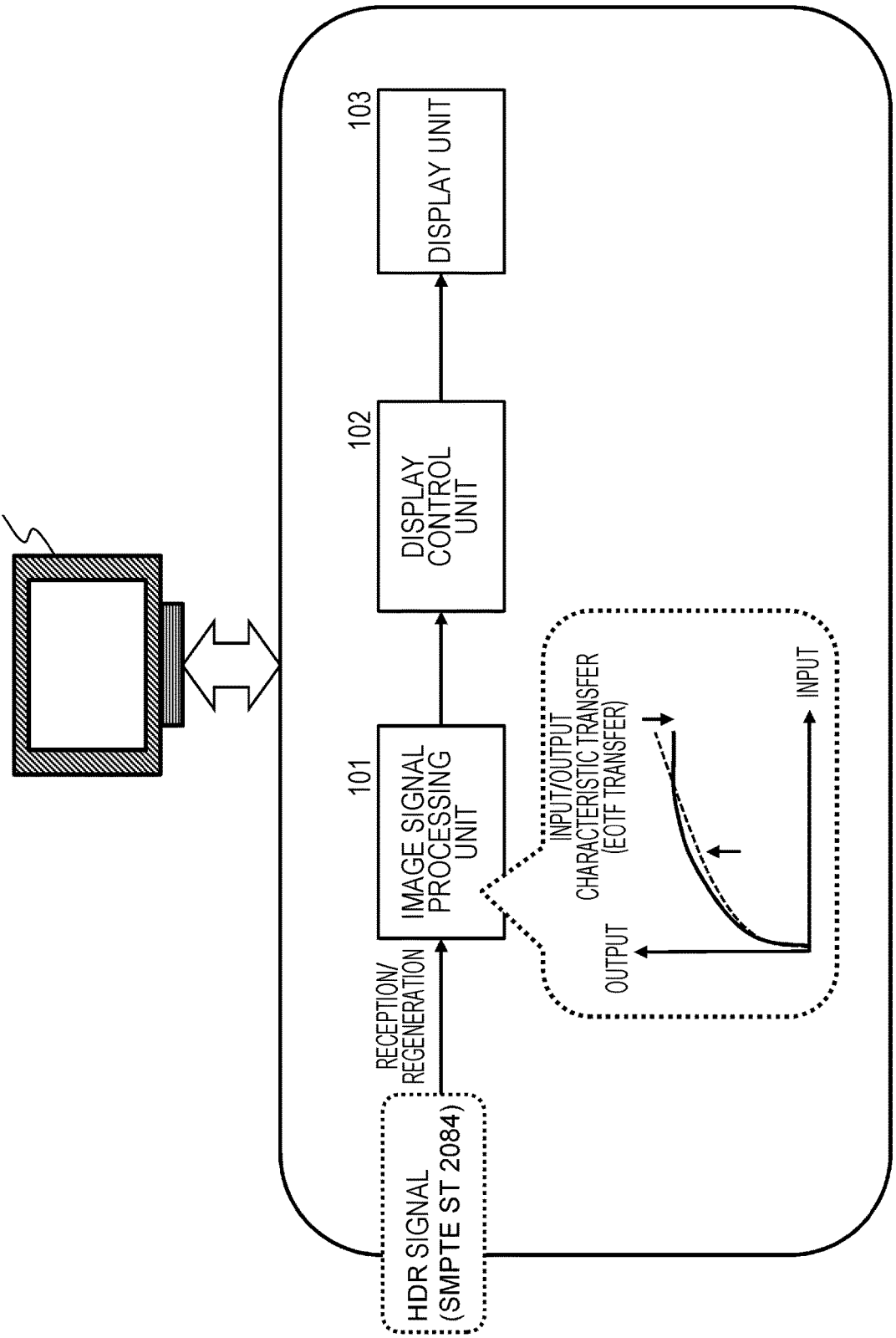
FIG. 15 is a diagram illustrating the configuration and the processing of the image processing apparatus executing the transfer processing of the input/output characteristic of the HDR image.

The image processing apparatus 100 illustrated in FIG. 15, for example, is the contents viewing monitor 31 illustrated in FIG. 12. Furthermore, the image processing apparatus 100 may be other devices, for example, various devices including a display unit, such as a television, a smart phone, and a PC.

The image processing apparatus 100, for example, displays received image data from a broadcasting station, a streaming server, or the like, or regeneration image data from a medium such as a Blu-ray (registered trademark) disc (BD), on the display unit 103.

The image signal processing unit 101, for example, decodes a coded stream input from a broadcasting station or a server, or a medium such as a Blu-ray (registered trademark) disc (BD), and outputs an image signal generated on the basis of the decoded data, to the display control unit 102. For example, an output signal according to the display characteristic of the display unit 103, is generated, and is output to the display control unit 102.

In the image signal processing unit 101, the transfer processing of the input/output transfer function (EOTF), described with reference to FIG. 13 or FIG. 14, is executed.

Furthermore, hereinafter, processing in a case where the highest allowable luminance of the display unit in the image processing apparatus 100, is set as described with reference to FIG. 13, that is, is 1000 cd/m$^2$, will be described.

The image signal processing unit transfers the input/output transfer function (EOTF) of the input HDR image, that is, the SMPTE ST 2084 curve (EOTFa:fa(x) illustrated in FIG. 13), according to a predetermined transfer algorithm, and generates a new transfer function of the HDR image for display, for example, the input/output transfer function (EOTFb1:fb1(x)) illustrated in FIG. 13.

Calculation processing of the new input/output transfer function, for example, is executed by multiplying a gain G specified in advance according to each of the input signal values (x), and the original input/output transfer function (EOTFa:fa(x)) of the input HDR image, together.

Figure 16:
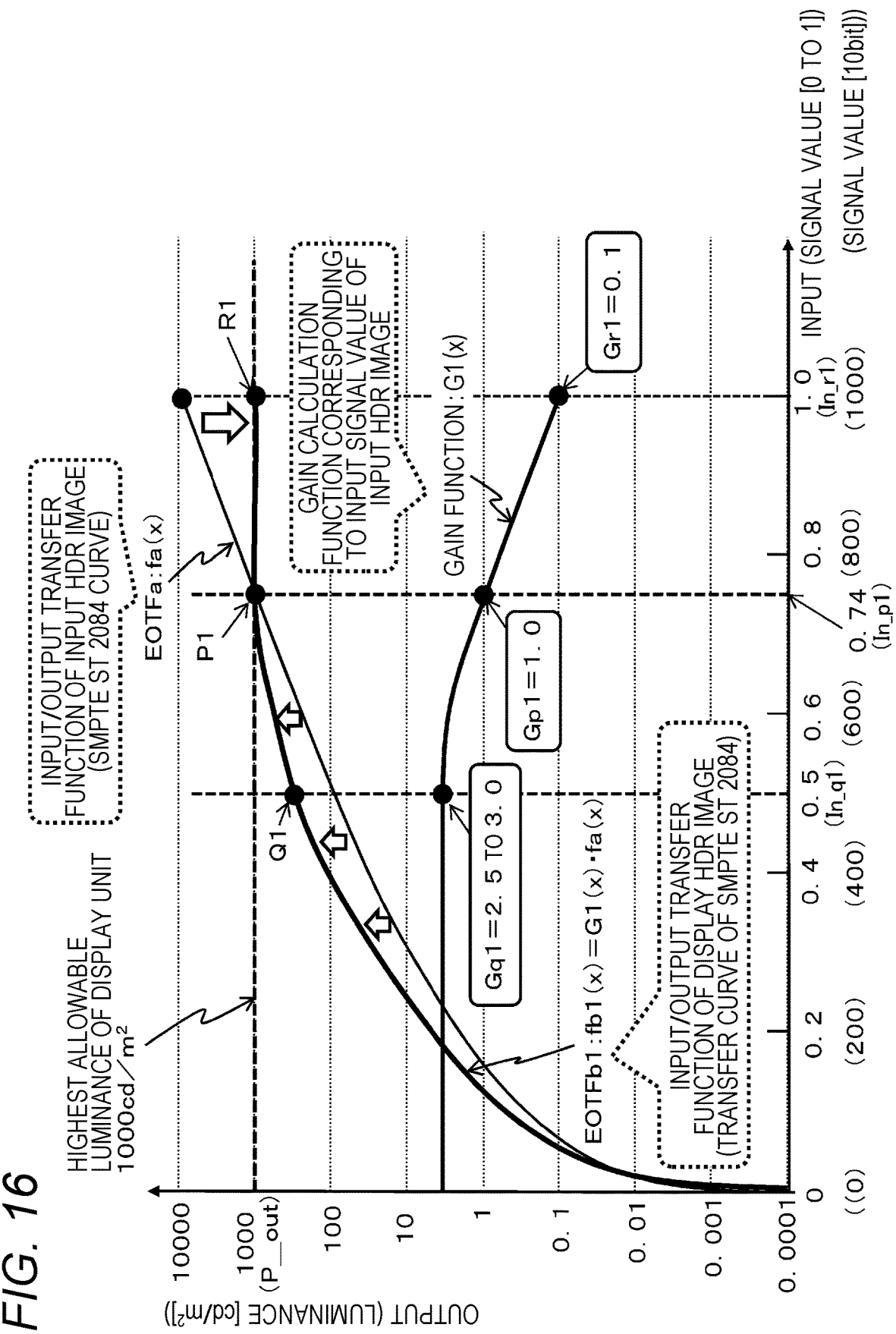
FIG. 16 is a diagram illustrating an example of a gain function to be applied to the transfer processing of the input/output characteristic of the HDR image.

FIG. 16 illustrates an example of a gain function G1(x)

The gain function G1(x) illustrated in FIG. 16, is a function for specifying the gain value y set in advance according to the input signal value (x).

The gain function G1 (x) illustrated in FIG. 16, function having setting of the gain value satisfying the condition described above with reference to FIG. 12. That is, the condition is the following condition.

(Condition) The gain function G(x) of setting a gain to be greater than or equal to 1 in the input signal value range of less than or equal to the input signal value (In_p) of the reference point P on the input/output transfer function (EOTF) of the input HDR image, and to be less than or equal to 1 in the input signal value range of greater than or equal to the input signal value (In_p), is applied to the input/output transfer function (EOTFa:fa(x)) of the input HDR image, and thus, a display image is generated.

The gain function G1 (x) illustrated in FIG. 16, satisfies (Condition) described above.

The gain function G1(x) illustrated in FIG. 16, sets a gain value to be greater than or equal to 1 in the input signal value range (the input signal value of 0 to 0.74) where the reference point P1 on the input/output transfer function (EOTF) of the input HDR image is less than or equal to the input signal value (In_p1=0.74).

In addition, the gain function G1(x) sets the gain value to be less than or equal to 1 in the input signal value range (the input signal value of 0.74 to 1.0) where the reference point P1 is less than or equal to the input signal value (In_p1=0.74).

The gain value of the gain function G1 (x) in the input signal value (In_p1=0.74) of the reference point P1, is 1, and at this reference point, an output luminance of the input/output transfer function (EOTFa:fa(x)) of the original input HDR image, is coincident with an output luminance of the new input/output transfer function (EOTFb1:fb1(x)) after transfer. An output luminance of the reference point P1, is the highest luminance of the display unit of 1000 cd/m².

That is, the gain value in the input signal value (In_p1=0.74), is 1.0.

In addition, the gain value is set to be greater than or equal to 1, in the input signal value range (the input signal value of 0 to 0.74) where the reference point P1 on the input/output transfer function (EOTF) of the input HDR image is less than or equal to the input signal value (In_p1=0.74).

For example, Q1 illustrated in FIG. 16, is a position indicating the output luminance of the new input/output transfer function (EOTFb1:fb1 (x)) after transfer, at the input signal value of 0.5 (In_q1), and is an output luminance of approximately 250 cd/m² to 300 cd/m². The output luminance of the input/output transfer function (EOTFa:fa (x)) of the original input HDR image at the input signal value of 0.5 (In_q1), is approximately 100 cd/m², and a gain value Gq1 in the position, is approximately 2.5 to 3.0.

On the other hand, the gain value is set to be less than or equal to 1, in the input signal value range (the input signal value of 0.74 to 1.0) where the reference point P1 on the input/output transfer function (EOTF) of the input HDR image is greater than or equal to the input signal value (In_p1=0.74).

For example, R1 illustrated in FIG. 16, is a position indicating the output luminance of the new input/output transfer function (EOTFb1:fb1 (x)) after transfer, at the input signal value of 1.0 (In_r1), and is an output luminance of 1000 cd/m², which is the highest allowable luminance of the display unit. The output luminance of the input/output transfer function (EOTFa:fa(x)) of the original input HDR image at the input signal value of 1.0 (In_r1), is approximately 10000 cd/m², and a gain value Gr1 in the position, is approximately 0.1.

Furthermore, the gain function G1 (x) illustrated in FIG. 16, sets the gain value to be greater than or equal to 1, in the input signal value range (the input signal value of 0 to 0.74) where the reference point P1 on the input/output transfer function (EOTF) of the input HDR image is less than or equal to the input signal value (In_p1=0.74).

In a range in which the gain value is greater than or equal to 1, it is preferable to set the same gain value in the maximum range. This is because there is a case where a color shade of an output image, or the like is changed according to a change in the gain, and there is a possibility that a difference from the original image is generated.

In an example illustrated in FIG. 16, for example, the gain value is maintained to 3.0 in the range of the input signal value of 0 to 0.5, and thus, a color shade of an image in the range can be similar to the original image.

Thus, the image signal processing unit 101 of the image processing apparatus 100 illustrated in FIG. 15, applies the gain function G1(x) satisfying the following condition to the input/output transfer function (EOTFa:fa(x)) of the original input HDR image, and thus, generates a new input/output transfer function (EOTFb1:fb1(x)).

(Condition) The gain function G(x) of setting a gain to be greater than or equal to 1 in the input signal value range of less than or equal to the input signal value (In_p) of the reference point P on the input/output transfer function (EOTF) of the input HDR image, and to be less than or equal to 1 in the input signal value range of greater than or equal to the input signal value (In_p), is applied to the input/output transfer function (EOTFa:fa(x)) of the input HDR image, and thus, a display image is generated.

The image signal processing unit 101 calculates the new input/output transfer function (EOTFb1:fb1(x)) by the following expression.

$$fb1(x)=G1(x) \times fa(x)$$

According to the expression described above, the newly calculated input/output transfer function EOTFb1:fb1(x) is applied, and thus, in the input signal value x of 0 to (In_p1) of less than or equal to the reference point (P1), the output luminance is set to be higher than the setting luminance of the original transfer function EOTFa:fa(x).

On the other hand, in the input signal value x of (In_p1) to 1.0 of greater than or equal to the reference point (P1), the output luminance is set to be lower than the setting luminance of the original transfer function EOTFa:fa(x), for example, the highest allowable luminance of the display unit.

The image signal processing unit 101 illustrated in FIG. 15, for example, changes the original input/output transfer function (EOTFa:fa(x)) of the input HDR image by using the gain function G1(x), generates the new input/output transfer function (EOTFb1:fb1(x)), and calculates the output pixel value (the luminance) based on the input signal (x) of each of the pixels configuring the image, by applying the input/output transfer function (EOTFb1:fb1(x)).

The display control unit 102 generates an output signal with respect to the display unit 103, on the basis of the pixel value calculated by applying the new input/output transfer function (EOTFb1:fb1(x)), in the image signal processing unit 101.

The display unit 103 drives the display panel by using the input signal from the display control unit 102, and executes image display.

According to such processing, in the display unit 103, the output with respect to the input signal of less than or equal to the reference point P1, is output (a luminance) brighter than the original input HDR image, and the output with respect to the input signal of less than or equal to the reference point P1, is performed such that an image set to the highest allowable luminance of the display unit, is displayed.

As a result thereof, for example, in the case of observing the displayed image of the display unit 103 as contents in a bright living room, it is possible to observe the displayed image as a sufficiently bright image.

6. Plurality of Different Setting Examples of Reference Point P

An example of changing the gain setting by using the reference point P as a boundary, will be described with reference to FIG. 13 and FIG. 14. In the reference point P for setting the gain G to be 1.0, various different settings can be performed.

In the example described with reference to FIG. 13 and FIG. 14, an intersection between a curve of the input/output transfer function (EOTFa:fa(x)) of the input HDR image, and a line of the highest allowable luminance of the display unit, is set as the reference point P.

An example different from the setting of the reference point, will be described with reference to FIG. 17.

As with FIG. 13 and FIG. 14 described above, a graph illustrated in FIG. 17, is a graph including a log axis of a luminance (cd/m²) in which a horizontal axis is an input signal value (0 to 1.0), and a vertical axis is an output value.

Figure 17:
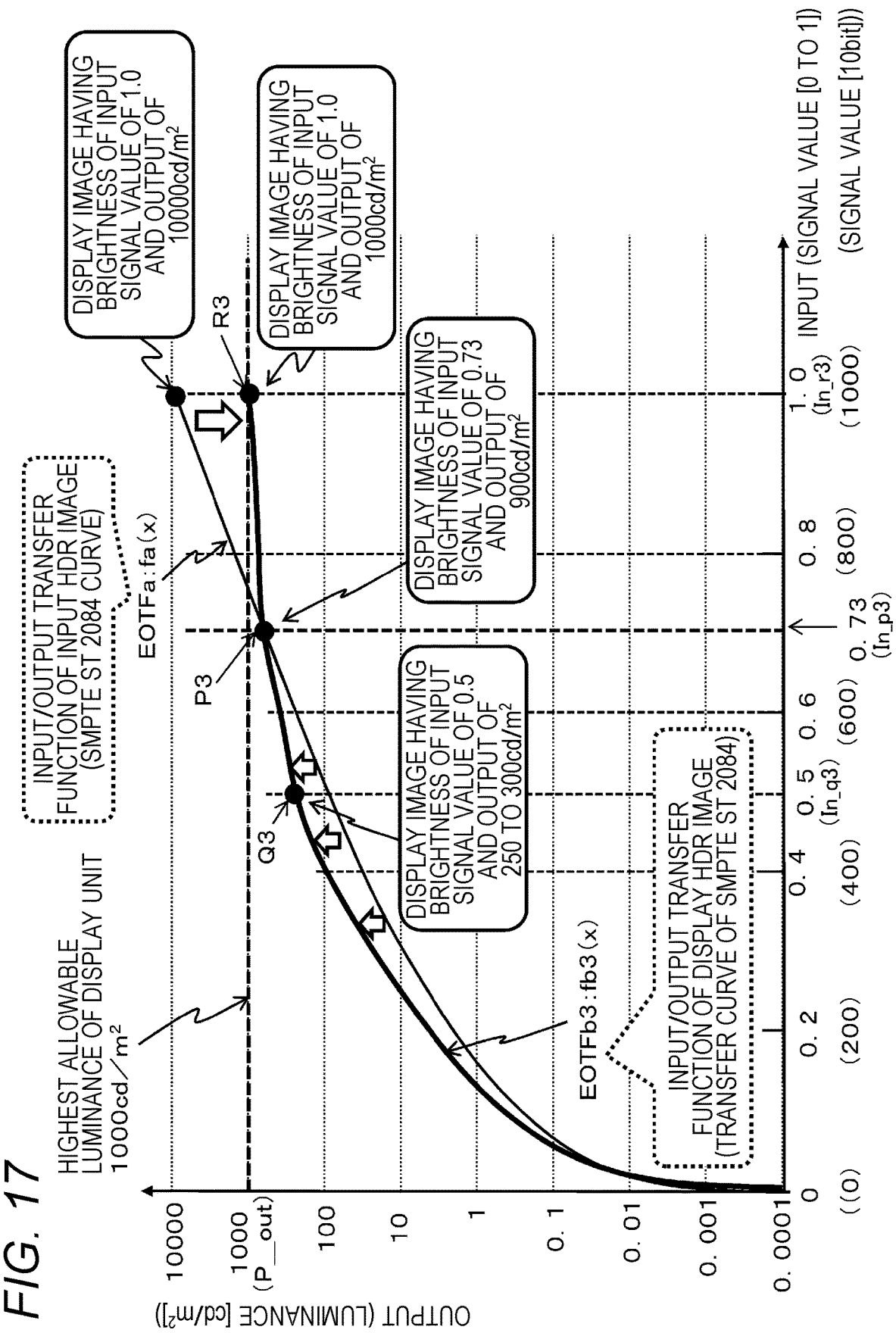
FIG. 17 is a diagram illustrating an example of the transfer processing of the input/output characteristic of the HDR image, to be executed by the image processing apparatus of the present disclosure.

FIG. 17 illustrates the following two input/output characteristic curves (EOTF curves).

(a) EOTFa:fa(x)

(b) EOTFb3:fb3(x)

(a) EOTFa:fa(x) is the input/output transfer function of the input HDR image, and is the input/output characteristic of the contents produced in the dark room. That is, EOTFa: fa(x) corresponds to the SMPTE ST 2084 curve which is the EOTF of the HDR image, described with reference to FIG. 9.

EOTFa:fa(x) is set as a function for calculating the output luminance y of 10000 cd/m² in the input signal x of 1.0.

On the other hand, (b) EOTFb3:fb3(x) is a new input/output characteristic of the HDR image for display, generated by the input/output characteristic transfer processing that is executed in the contents viewing monitor 31 as the image processing apparatus.

As illustrated, EOTFb3:fb3 (x) is set as an input/output transfer function satisfying the following condition.

(Condition) The gain function G(x) of setting a gain to be greater than or equal to 1 in an input signal value range (an input signal of 0 to 0.73) where a reference point P3 on the input/output transfer function (EOTFa:fa(x)) of the input HDR image is less than or equal to an input signal value (In_p3=0.73), and to be less than or equal to 1 in an input signal value range (an input signal of 0.73 to 1.0) where the reference point P3 is greater than or equal to the input signal value (In_p3=0.73), is applied to the input/output transfer function (EOTFa:fa(x)) of the input HDR image, and thus, a display image is generated.

As with the example described above with reference to FIG. 13, in an example illustrated in FIG. 17, the highest allowable luminance of the display unit is 1000 cd/m², but the reference point P is not set on the intersection of the curve of the input/output transfer function (EOTFa:fa(x)) of the input HDR image, and the line of the highest allowable luminance (1000 cd/m²) of the display unit.

In the example illustrated in FIG. 17, the reference point P3 is set on a point before the curve of the input/output transfer function (EOTFa:fa(x)) of the input HDR image, reaches the highest allowable luminance (1000 cd/m²) of the display unit.

In the input signal of 0.73 (In_p3), an output value the curve of the input/output transfer function (EOTFa:fa(x)) of the input HDR image, is approximately 900 cd/m², and the position is set as the reference point P3.

The gain is set to be greater than or equal to 1 in the input signal value range (the input signal of 0 to 0.73) where the reference point P3 on the input/output transfer function (EOTFa:fa(x)) of the input HDR image is less than or equal to the input signal value (In_p3=0.73), and thus, the output with respect to the input signal value of 0 to 0.73, is set such that the luminance is higher than that of the original OETF: fa(x) corresponding to the input HDR image, that is, the brightness increases.

For example, a point Q3 illustrated in FIG. 17, indicates an output point of EOTFb3:fb3 (x) after transfer, corresponding to the input signal value of 0.5 (In_q3), and an output luminance of Q3 is approximately 250 cd/m² to 300 cd/m².

The output (the luminance) increases, compared to an output luminance (approximately 100 cd/m²) in the input signal value of 0.5 (In_q3) of the original OETF:fa(x) corresponding to the original input HDR image.

On the other hand, the gain is set to be less than or equal to 1 in the input signal value range (the input signal of 0.73 to 1.0) where the reference point P3 on the input/output transfer function (EOTFa:fa(x)) of the input HDR image is greater than or equal to the input signal value (In_p3=0.73), and thus, the output of the input signal value of 0.73 to 1.0, is a luminance lower than that of the original OETF:fa(x) corresponding to the input HDR image.

Furthermore, in such a range, that is, the range of the input signal value of 0.73 to 1.0, the output luminance is set to smoothly increase to the highest allowable luminance (1000 cd/m²) of the display unit, by the OETFb2:fb3(x) after transfer.

For example, a point R3 illustrated in FIG. 17, indicates an output point of EOTFb3: fb3 (x) after transfer, corresponding to the input signal value of 1.0 (In_r3), and an output luminance of R3 is the highest allowable luminance (1000 cd/m²) of the display unit.

Furthermore, the setting of the output value with respect to the input signal, is determined according to the setting of the gain function, and can be set to various aspects according to a change in the setting of the gain function.

Figure 18:
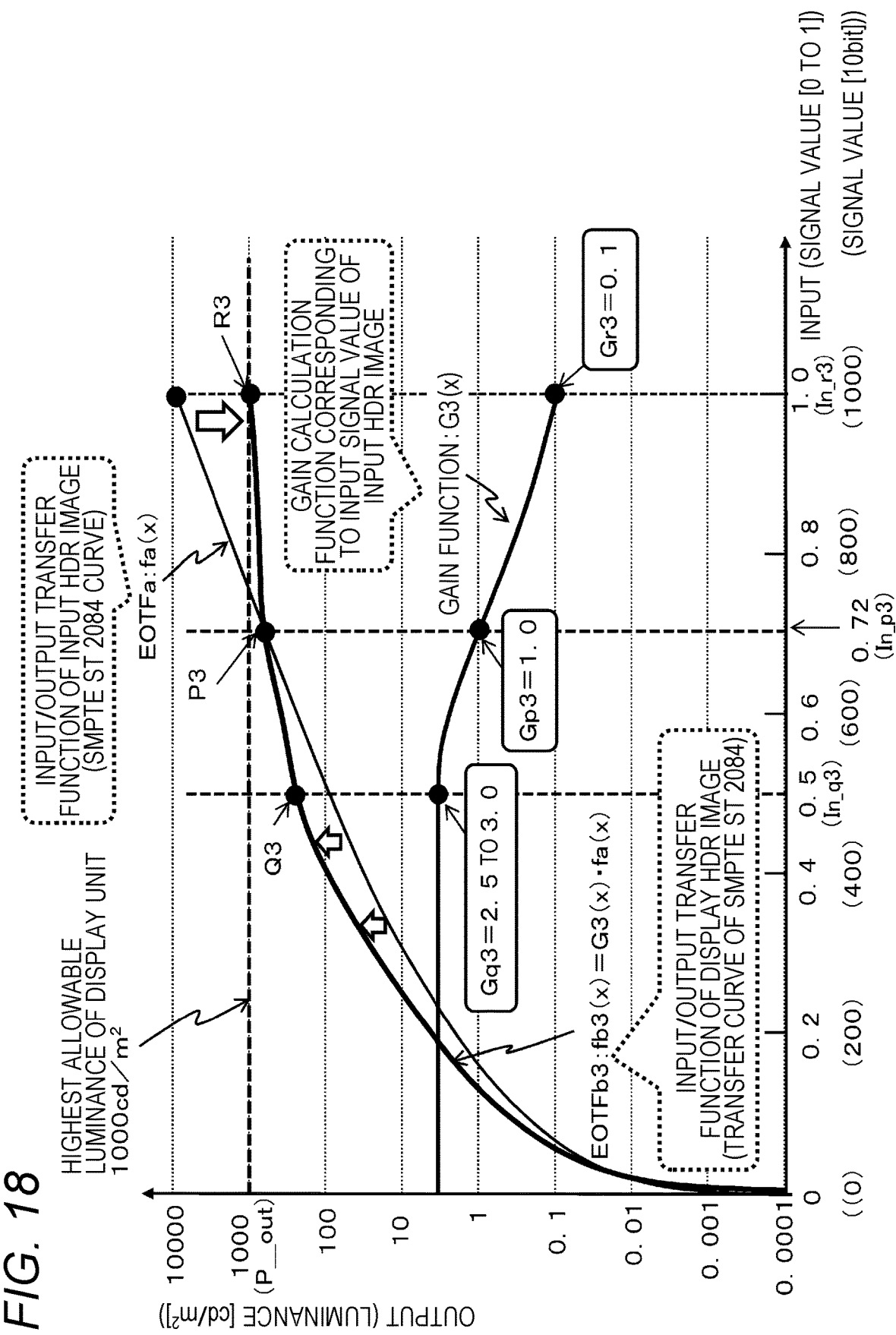
FIG. 18 is a diagram illustrating an example of the gain function to be applied to the transfer processing of the input/output characteristic of the HDR image.

An example of a gain function G3(x) for generating the input/output transfer curve (EOTFb3:fb3(x)) illustrated in FIG. 17, is illustrated in FIG. 18.

As illustrated in FIG. 18, in the gain function G3(x), a gain value is 1.0 in an input signal position (the input signal of 0.73 (In_p3)) of the reference point P3.

In addition, in the gain function G3 (x), the gain value is greater than or equal to 1.0 in a position of less than or equal to the input signal position (the input signal of 0.73 (In_p3)) of the reference point P3.

In addition, the gain value is less than or equal to 1.0 in a position of greater than or equal to the input signal position (the input signal of 0.73 (In_p3)) of the reference point P3.

The image signal processing unit 101 of the image processing apparatus 100 illustrated in FIG. 15, calculates a new input/output transfer function (EOTFb3:fb3(x)) by the following expression.

$$fb3(x)=G3(x) \times fa(x)$$

According to the expression described above, the newly calculated transfer function EOTFb3:fb3(x) is applied, and thus, in the input signal value x of 0 to (In_p3) of less than or equal to the reference point (P3), the output luminance is set to be higher than the setting luminance of the original transfer function EOTFa:fa(x).

On the other hand, in the input signal value x of (In_p3) to 1.0 of greater than or equal to the reference point (P3), the output luminance is set to be lower than the setting luminance of the original transfer function EOTFa:fa(x).

The transfer processing of the input/output characteristic curve is executed by applying such a gain function (G3 (x)), and thus, the output luminance with respect to the input signal of less than or equal to the reference point P3, is set to be higher than the luminance value of the original pixel of the original input HDR image. As a result thereof, in the case of performing viewing in a bright environment, it is possible to display and view sufficiently bright HDR image contents in the setting of less than or equal to the highest allowable luminance of the display unit.

7. Example of Changing Gain Setting or Reference Point According to Mode

In a case where the user views the contents on the television, it is not limited to a case where the contents are viewed in a bright environment, and there is a case where contents appreciation is performed in a dark environment such as a theater.

In the case of performing the contents appreciation in such a dark environment, there is a case where the luminance of the display image of the television also seems to be lowered.

Many televisions include a plurality of display modes that can be set by the user.

For example, the following two modes are provided.

(Mode 1) A normal mode of displaying a bright image (or a living room mode)

(Mode 2) A cinema mode of displaying an image of which the brightness is suppressed An example of changing the gain setting or the reference point according to the mode set by the user, will be described.

Figure 19:
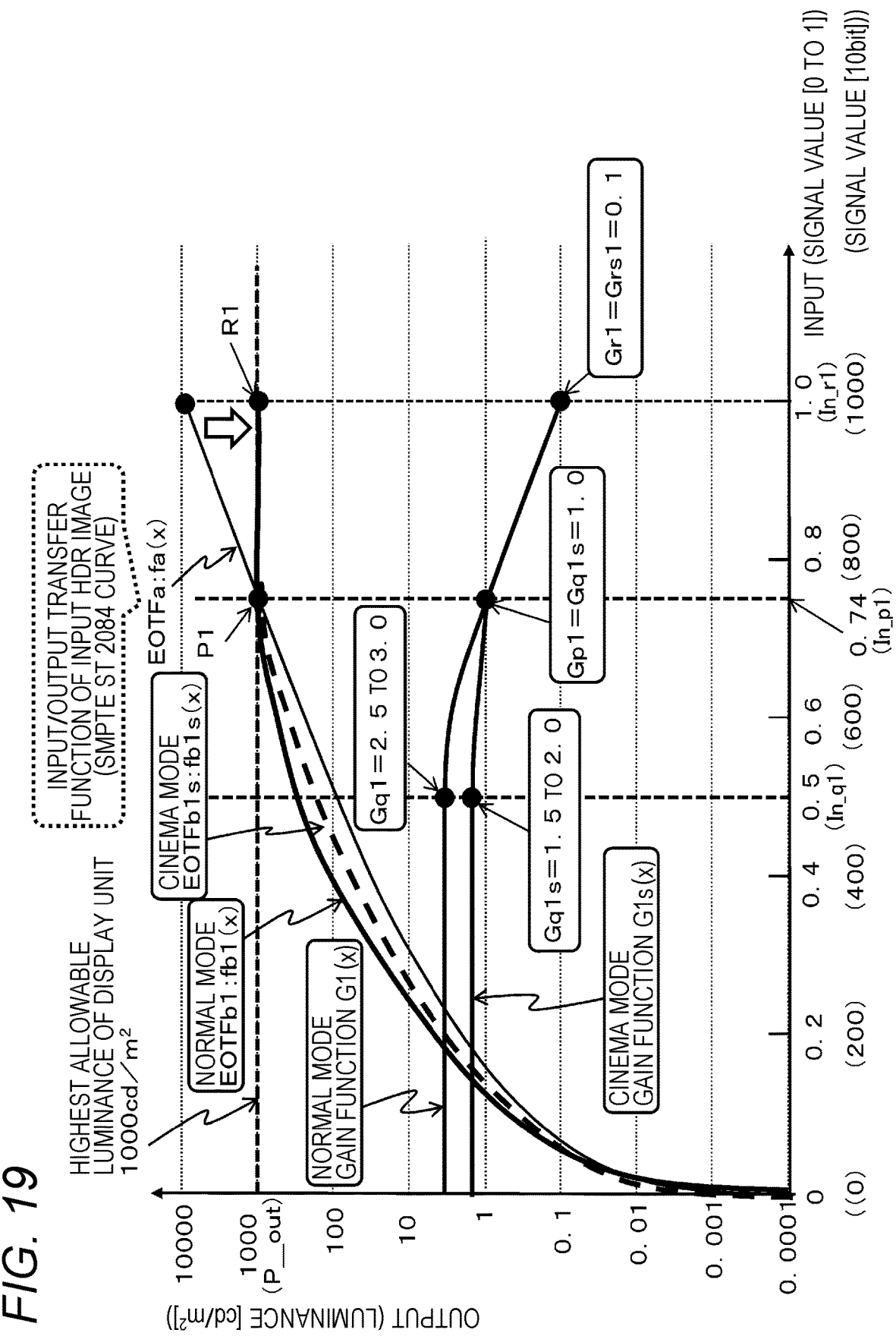
FIG. 19 is a diagram illustrating an example of the transfer processing of the input/output characteristic of the HDR image, to be executed by the image processing apparatus of the present disclosure, and the gain function to be applied to the transfer processing.

FIG. 19 is a diagram illustrating an example of changing the gain setting, according to the mode set by the user.

FIG. 19 illustrates the following three input/output characteristic curves (EOTF curves).

(a) EOTFa:fa(x)
(b) EOTFb1:fb1(x)
(c) EOTFb1s:fb1s(x)

(a) EOTFa:fa(x) is the input/output transfer function of the input HDR image, and is the input/output characteristic of the contents produced in the dark room. That is, EOTFa:fa(x) corresponds to the SMPTE ST 2084 curve which is the EOTF of the HDR image, described with reference to FIG. 9.

EOTFa:fa(x) is set as a function for calculating the output luminance y of 10000 cd/m$^2$ in the input signal x of 1.0.

In addition, two EOTFs of (b) EOTFb1:fb1(x)
(c) EOTFb1s:fb1s(x)

are a new input/output characteristic of the HDR image for display, generated by the input/output characteristic transfer processing that is executed in the contents viewing monitor 31 as the image processing apparatus.

(b) EOTFb1:fb1 (x) is an input/output transfer function, as described above with reference to FIG. 13 or FIG. 16, and is an EOTF corresponding (Mode 1).

(Mode 1) A normal mode of displaying a bright image (or a living room mode)

On the other hand, (c) EOTFb1s:fb1s(x) is an EOTF corresponding to (Mode 2).

(Mode 2) A cinema mode of displaying an image of which the brightness is suppressed Using which of the two EOTFs, that is, (b) EOTFb1:fb1(x)
(c) EOTFb1s:fb1s(x)

is determined according to the mode setting of the user. Furthermore, both of the two EOTFs of (b) EOTFb1:fb1(x)
(c) EOTFb1s:fb1s(x)

satisfy (Condition), as described above.

(Condition) The gain function G(x) of setting a gain to be greater than or equal to 1 in an input signal value range (an input signal of 0 to 0.73) where the reference point P1 on the input/output transfer function (EOTFa:fa(x)) of the input HDR image is less than or equal to an input signal value (In_p1=0.73), and to be less than or equal to 1 in an input signal value range (an input signal of 0.73 to 1.0) where the reference point P1 is greater than or equal to the input signal value (In_p1=0.73), is applied to the input/output transfer function (EOTFa:fa(x)) of the input HDR image, and thus, a display image is generated.

Furthermore, in an example illustrated in FIG. 19, the highest allowable luminance of the display unit is 1000 cd/m$^2$.

Further, FIG. 19 illustrates two gain functions G1(x) and G1s(x).

The gain function G1(x) is the gain function G1(x) described above with reference to FIG. 16, and is a gain function corresponding to "(Mode 1) A normal mode of displaying a bright image (or a living room mode)".

On the other hand, the gain function G1s(x) is a gain function corresponding to "(Mode 2) A cinema mode".

In the input signal value (0 to In_p1) of less than or equal to the reference point P1, a gain value of the gain function G1s(x) corresponding to the cinema mode is set to be less than a gain value of the gain function G1 (x) corresponding to the normal mode.

With this arrangement, in the case of using the gain function G1s(x) corresponding to the cinema mode, the output with respect to the input signal value (0 to In_p1) of less than or equal to the reference point P1, is lower than the output of a case of using the gain function G1 (x) corresponding to the normal mode, that is, an image of which the brightness is suppressed, is displayed.

Thus, the gain function to be used is switched according to the mode selected by the user, and display image generation processing to which different EOTFs are applied, is executed according to the switch.

In a case where the user selects the cinema mode, the gain function G1s(x) corresponding to the cinema mode is selected, and input/output transfer processing to which a cinema mode EOTFb1s:fb1s(x) illustrated in FIG. 19 is applied, is executed.

On the other hand, in a case where the user selects the normal mode, the gain function G1(x) corresponding to the normal mode is selected, and input/output transfer processing to which a normal mode EOTFb1:fb1(x) illustrated in FIG. 19 is applied, is executed.

Thus, different images can be displayed according to the mode setting.

Furthermore, in an example illustrated in FIG. 19, the setting of the gain function G1s (x) corresponding to the cinema mode, is setting in which the gain value in the input signal value (0 to In_p1) of less than or equal to the reference point P1, is in a range of 1.0 to 2.0, and in the cinema mode, an output value in the range of the input signal value (0 to In_p1), is brighter than a case of using the SMPTE ST 2084 which is the original input/output characteristic.

The gain function corresponding to the cinema mode, can be in other settings. For example, the setting of the gain function G1s(x) corresponding to the cinema mode, is setting in which all of the gain values in the range of the input signal value (0 to In_p1) of less than or equal to the reference point P1, are 1.0.

According to such setting, the output value of the range of the input signal value (0 to In_p1) in the cinema mode, can be in the same setting as that of a case of using the SMPTE ST 2084 which is the original input/output characteristic.

Figure 20:
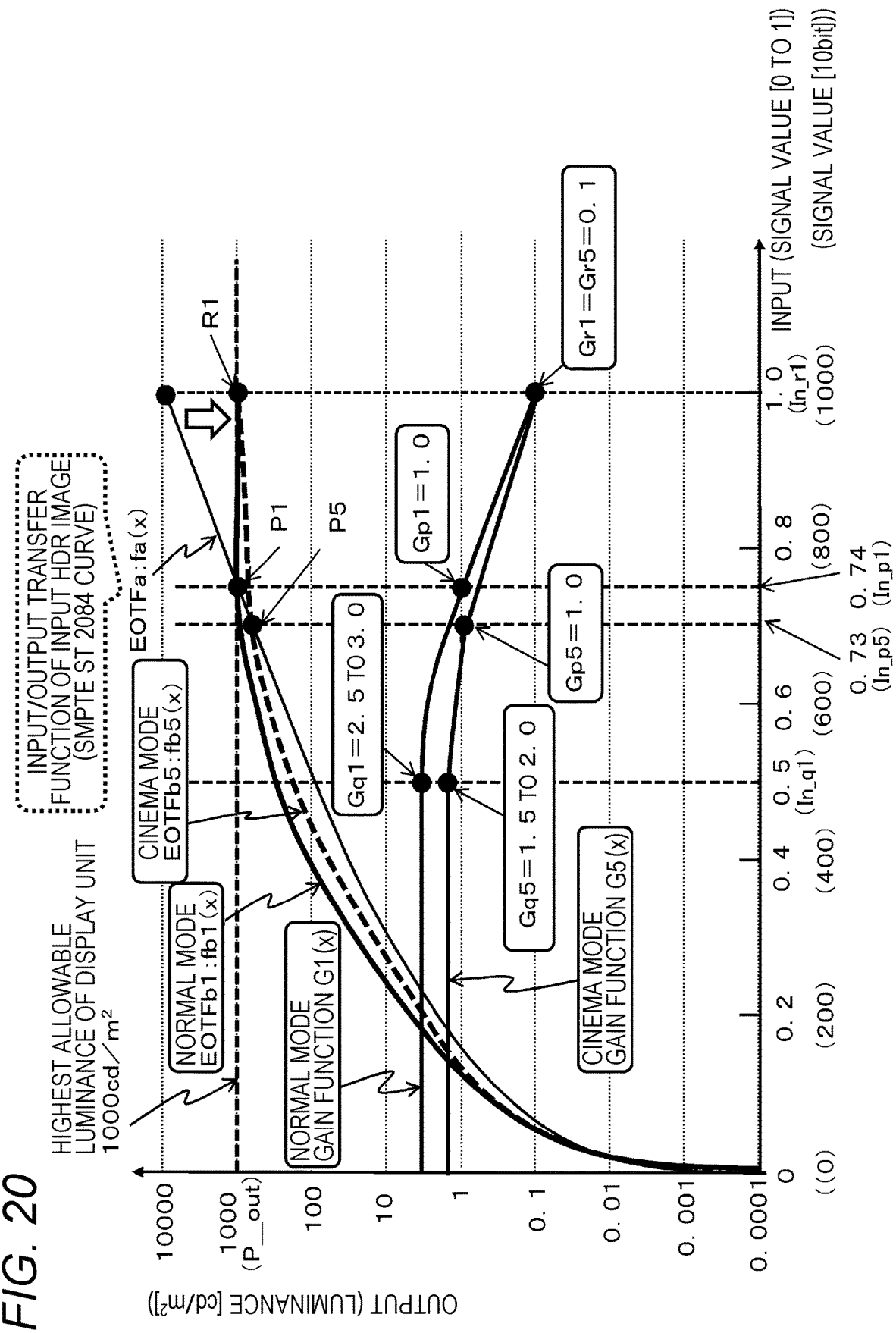
FIG. 20 is a diagram illustrating an example of the transfer processing of the input/output characteristic of the HDR image, to be executed by the image processing apparatus of the present disclosure, and the gain function to be applied to the transfer processing.

FIG. 20 is a diagram illustrating an example of changing the gain setting and the reference point together, according to the mode set by the user.

As with FIG. 19, FIG. 20 illustrates the following three input/output characteristic curves (EOTF curves).

(a) EOTFa:fa(x)
(b) EOTFb1:fb1(x)
(c) EOTFb5:fb5(x)

(a) EOTFa:fa(x) is the input/output transfer function of the input HDR image, and is the input/output characteristic of the contents produced in the dark room. That is, EOTFa:

fa(x) corresponds to the SMPTE ST 2084 curve which is the EOTF of the HDR image, described with reference to FIG. 9.

EOTFa:fa(x) is set as a function for calculating the output luminance y of 10000 cd/m² in the input signal x of 1.0.

In addition, two EOTFs of (b) EOTFb1:fb1(x)

(c) EOTFb5:fb5(x)

are a new input/output characteristic of the HDR image for display, generated by the input/output characteristic transfer processing that is executed in the contents viewing monitor 31 as the image processing apparatus.

(b) EOTFb1:fb1 (x) is an input/output transfer function, as described above with reference to FIG. 13 or FIG. 16, and is an EOTF corresponding to (Mode 1).

(Mode 1) A normal mode of displaying a bright image (or a living room mode)

On the other hand, (c) EOTFb5:fb5(x) is an EOTF corresponding to (Mode 2).

(Mode 2) A cinema mode of displaying an image of which the brightness is suppressed Using which of the two EOTFs, that is, (b) EOTFb1:fb1(x)

(c) EOTFb5:fb5(x)

is determined according to the mode setting of the user.

Furthermore, in an EOTF of (b) EOTFb1:fb1(x), the reference point P1 is set on an intersection between the input/output transfer function (EOTFa:fa(x)) of the input HDR image and the highest allowable luminance of the display unit of 1000 cd/m², and the EOTF satisfies (Condition), as described above.

(Condition) The gain function G(x) of setting a gain to be greater than or equal to 1 in the input signal value range (the input signal of 0 to 0.74) where the reference point P1 the on the input/output transfer function (EOTFa:fa(x)) of the input HDR image is less than or equal to the input signal value (In_p1=0.74), and is to be less than or equal to 1 in the input signal value range (the input signal of 0.74 to 1.0) where reference point P1 is greater than or equal to the input signal value (In_p1=0.74), is applied to the input/output transfer function (EOTFa:fa(x)) of the input HDR image, and thus, a display image is generated.

On the other hand, in an EOTF of (c) EOTFb5:fb5(x), a reference point P5 is set on an output luminance position in which an output luminance is approximately 900 cd/m² which is lower than the highest allowable luminance of the display unit of 1000 cd/m², on the input/output transfer function (EOTFa:fa(x)), but not on an intersection position between the input/output transfer function (EOTFa:fa(x)) of the input HDR image and the highest allowable luminance of the display unit of 1000 cd/m².

Here, the EOTF satisfies (Condition) described below.

(Condition) The gain function G(x) of setting a gain to be greater than or equal to 1 in the input signal value range (the input signal of 0 to 0.73) where the reference point P5 on the input/output transfer function (EOTFa:fa(x)) of the input HDR image is less than or equal to an input signal value (In_p5=0.73), and to be less than or equal to 1 in the input signal value range (the input signal of 0.73 to 1.0) where the reference point P5 is greater than or equal to the input signal value (In_p5=0.73), is applied to the input/output transfer function (EOTFa:fa(x)) of the input HDR image, and thus, a display image is generated.

Further, FIG. 20 illustrates two gain functions G1(x) and G5(x).

The gain function G1(x) is the gain function G1(x) described above with reference to FIG. 16, and is again function corresponding to "(Mode 1) A normal mode of displaying a bright image (or a living room mode)".

On the other hand, the gain function G5(x) is a gain function corresponding to "(Mode 2) A cinema mode".

In the input signal value (0 to In_p5) of less than or equal to the reference point P5, a gain value of the gain function G5 (x) corresponding to the cinema mode is less than or equal to 1, and is set to be less than a gain value of the gain function G1(x) corresponding to the normal mode.

Further, in the input signal value (In_p5 to 1.0) of greater than or equal to the reference point P5, the gain value of the gain function G5(x) is less than or equal to 1, and is set to be less than the gain value of the gain function G1(x) corresponding to the normal mode.

With this arrangement, in the case of using the gain function G5(x) corresponding to the cinema mode, the output with respect to all of the input values of 0 to 1.0, is lower than the output in the case of using the gain function G1(x) corresponding to the normal mode, that is, an image of which the brightness is suppressed, is displayed.

Thus, the gain function to be used is switched according to the mode selected by the user, and display image generation processing to which different EOTFs are applied, is executed according to the switch.

In a case where the user selects the cinema mode, the gain function G5(x) corresponding to the cinema mode is selected, and input/output transfer processing to which a cinema mode EOTFb5:fb5(x) illustrated in FIG. 20 is applied, is executed.

On the other hand, in a case where the user selects the normal mode, the gain function G1(x) corresponding to the normal mode is selected, and input/output transfer processing to which a normal mode EOTFb1:fb1(x) illustrated in FIG. 20 is applied, is executed.

Thus, different images can be displayed according to the mode setting.

8. Processing Sequence to be Executed by Image Processing Apparatus

Next, a sequence of the processing to be executed by the image processing apparatus, will be described with reference to a flowchart illustrated in FIG. 21.

Figure 21:
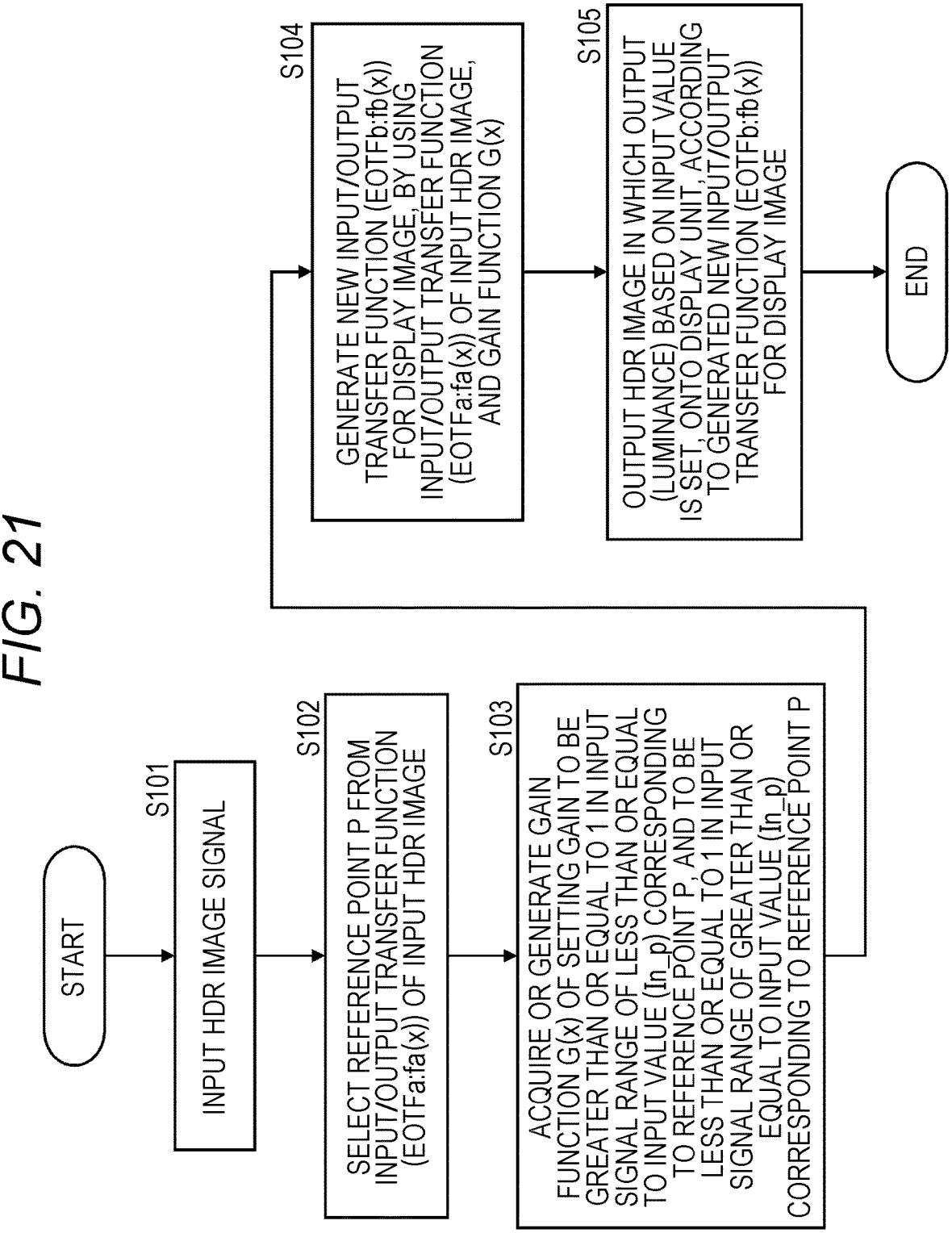
FIG. 21 is a diagram illustrating a flowchart illustrating a sequence of the processing to be executed by the image processing apparatus of the present disclosure.

For example, in the image signal processing unit 101, the display control unit 102, and the display unit 103 of the image processing apparatus 100 illustrated in FIG. 15, the processing according to the flowchart illustrated in FIG. 21, is executed according to a program stored in a recording unit of the image processing apparatus.

Hereinafter, processing of each step of the flowchart illustrated in FIG. 21, will be sequentially described.

(Step S101)

First, in step S101, for example, the image signal processing unit 101 of the image processing apparatus 100 illustrated in FIG. 15, inputs an HDR image signal.

The HDR image is image data included in the broadcasting contents received by the communication unit of the image processing apparatus through a broadcasting wave, the contents acquired from a contents server, or the regeneration contents from a medium such as a Blu-Ray (registered trademark) disc (BD) or a flash memory.

(Step S102)

Next, in step S102, the image signal processing unit 101 selects the reference point P from the input/output transfer function (EOTFa:fa(x)) of the input HDR image.

The reference point P is the reference point P described above with reference to FIG. 13 to FIG. 20, and the like, and the reference point P is a gain value change point of the gain function to be applied for generating a new HDR image input/output transfer function (EOTFb:fb(x)) for display by transferring the input/output transfer function (EOTFa:fa(x)) corresponding to the input HDR image, that is, a boundary position in which the gain value is set to be greater than or equal to 1 or to be less than or equal to 1.

In the input signal value of less than or equal to the input signal value of the reference point P, the gain is set to be greater than or equal to 1, and in the input signal value of greater than or equal to the input signal value of the reference point P, the gain is set to be less than or equal to 1. Thus, the reference point P is a boundary point which is a change point of the gain setting.

Selection processing of the reference point P is executed according to a program stored in advance in the recording unit.

Alternatively, the image signal processing unit 101 of the image processing apparatus 100 may determine the reference point P on the basis of the input/output transfer function (EOTFa:fa(x)) of the HDT image to be input, and display allowable luminance information of the display unit.

For example, in the example described above with reference to FIG. 13, the reference point P is set on the intersection between the curve of the input/output transfer function (EOTFa:fa(x)) (the SMPTE-ST 2084 curve) and the highest allowable luminance (1000 cd/m$^2$) of the display unit.

In addition, in the example described with reference to FIG. 17, the reference point P is set on the point of less than or equal to the highest allowable luminance (1000 cd/m$^2$) of the display unit, on the curve of the input/output transfer function (EOTFa:fa(x)) (the SMPTE-ST 2084 curve).

Furthermore, a plurality of reference point P selection algorithms corresponding to different input/output transfer functions (EOTFa:fa(x)) of each of various different types of HDR images input by the image processing apparatus, may be stored in the recording unit of the image processing apparatus, the type of input/output transfer function (EOTFa:fa(x)) of the input HDR image may be determined by the image signal processing unit 101 of the image processing apparatus, and an optimal reference point P selection algorithm may be selected and applied according to a determination result.

In the example described above, an example of setting the input/output transfer function (EOTFa:fa(x)) of the HDR image as the SMPTE ST 2084, is described, but a case of using an HDR image input/output characteristic curve other than the SMPTE ST 2084, is also assumed.

For example, an example of an HDR image having an input/output characteristic different from the SMPTE ST 2084 curve, includes an image according to an HLG mode.

The HDR image of the HLG mode is an HDR image using a hybrid log-gamma (HLG) curve in which a gamma curve and a log curve are combined, as the input/output signal transfer function.

Thus, in a case where the image processing apparatus performs processing by inputting different types of HDR images, different reference point P selection algorithms may be applied according to the type of input/output transfer function (EOTFa:fa(x)) of the input HDR image.

(Step S103)

Next, in step S103, the image signal processing unit 101 of the image processing apparatus 100 acquires or generates the gain function G(x) of setting a gain to be greater than or equal to 1 in an input signal range of less than or equal to an input value (In_p) corresponding to the reference point P determined in step S102, and to be less than or equal to 1 in an input signal range of greater than or equal to the input value (In_p) corresponding to the reference point P, from the recording unit.

The gain function G(x) is the gain function G(x) described with reference to FIG. 13 to FIG. 20, and is a gain function to be used for generating a new input/output transfer function (EOTFb:fb (x)) of the HDR image for display by applying the input/output transfer function (EOTFa:fa(x)) of the input HDR image.

A plurality of gain functions g(x) corresponding to different input/output transfer functions (EOTFa:fa(x)) of each of various different types of HDR images to be input by the image processing apparatus, are stored in the recording unit of the image processing apparatus 100.

The image signal processing unit 101 of the image processing apparatus 100, selects a gain function G(x) according to the type of input HDR image, from the recording unit.

Alternatively, the image signal processing unit 101 generates the gain function G(x) by applying a gain function G(x) generation algorithm according to the type of input HDR image.

Furthermore, the position of the reference point P determined in step S102, and the gain function G(x) acquired or generated in step S103, are determined according to the input/output characteristic of the input HDR image or the setting mode of the user.

For example, an SMPTE ST 2084 curve, a hybrid log-gamma (HLG) curve, or the like is exemplified as the type of input/output characteristic of the input HDR image.

In addition, a user setting mode is a normal mode (a living room mode) or a cinema mode.

(Step S104)

Next, in step S104, the image signal processing unit 101 of the image processing apparatus 100 generates a new input/output transfer function (EOTFb:fb(x)) for image display, by using the input/output transfer function (EOTFa:fa (x)) of the input HDR image, and the gain function G(x).

That is, for example, the new input/output transfer function (EOTFb:fb(x)) for display image is generated according to the following expression.

$$fb(x)=G(x) \times fa(x)$$

(Step S105)

Next, in step S105, the image signal processing unit 101 and the display control unit 102 of the image processing apparatus 100 output the HDR image in which the output (the luminance) based on the input value is set, onto the display unit, according to the new input/output transfer function (EOTFb:fb(x)) for display image, generated in step S104.

According to such processing, an image according to a new input/output characteristic generated according to the gain control, but not the original input/output characteristic of the input HDR image, is displayed on the image processing apparatus, for example, the television of the user.

The transfer processing of the input/output characteristic is executed, and thus, for example, in a case where the original pixel value (the luminance) of the input HDR image, is set to be less than or equal to the highest allowable luminance of the display unit, output is executed as a pixel having a luminance higher than the luminance calculated according to the original input/output function. In addition, in a case where the original pixel value (the luminance) of the input HDR image is set to be greater than or equal to the highest allowable luminance of the display unit, the output is executed at the highest allowable luminance of the display unit.

As a result thereof, display at a luminance higher than the setting luminance of the original image is executed with respect to at least the pixel of less than or equal to the highest allowable luminance of the display unit, and for example, in the case of viewing the HDR image in a bright living room environment, it is possible to display and view sufficiently bright HDR image contents.

The flowchart illustrated in FIG. 21, is a processing flow premised on the fact that the image data to be input into the image processing apparatus is the HDR image.

However, at present, it is assumed that the HDR image and the SDR image are mixed in an input image of the image processing apparatus, that is, an image to be input through a network or a medium.

A processing sequence in the case of inputting images having different dynamic ranges, will be described with reference to a flowchart illustrated in FIG. 22.

Figure 22:
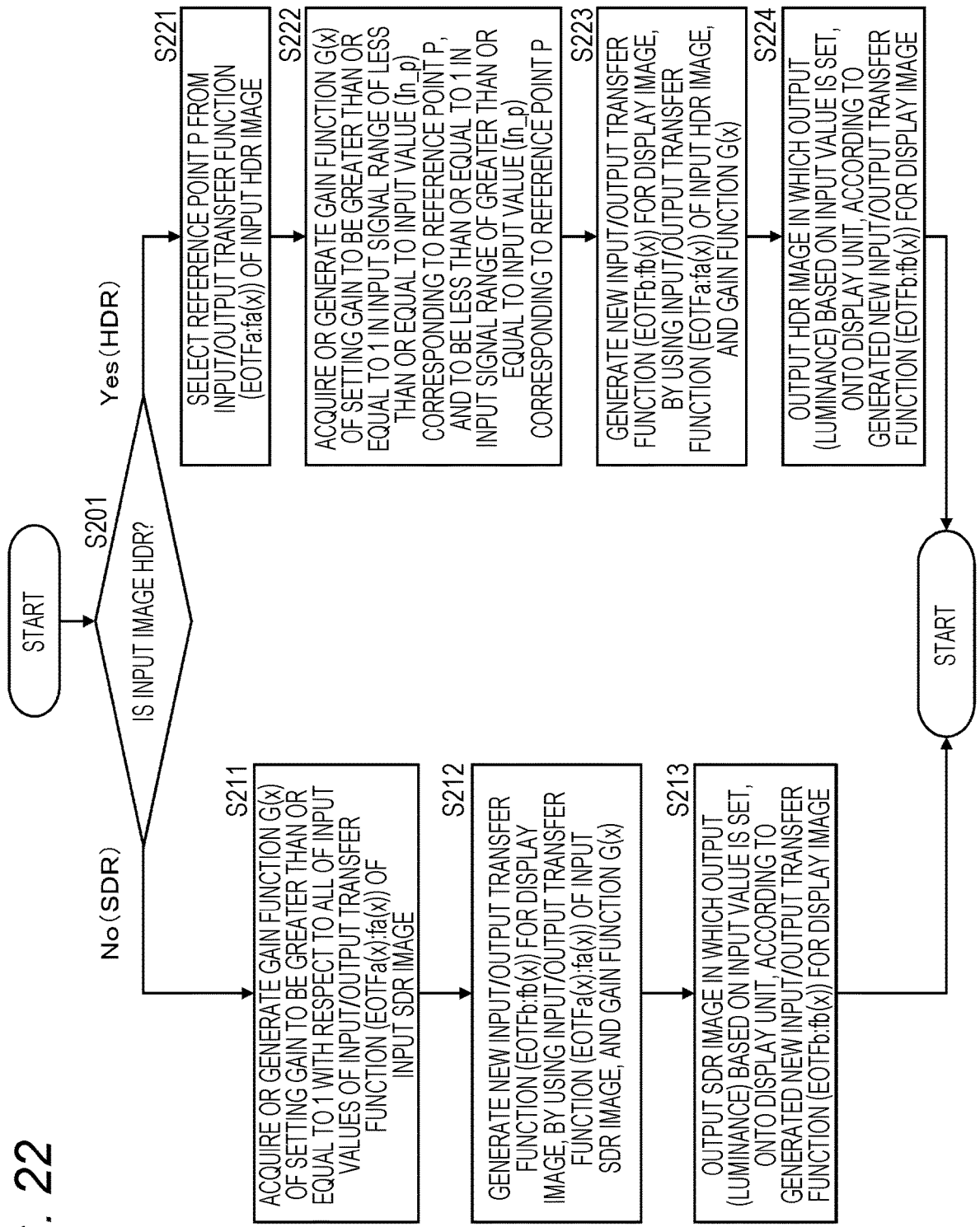
FIG. 22 is a diagram illustrating a flowchart illustrating the sequence of the processing to be executed by the image processing apparatus of the present disclosure.

The processing according to the flowchart illustrated in FIG. 22, for example, is executed in the image signal processing unit 101 and the display control unit 102 of the image processing apparatus 100 illustrated in FIG. 7 or FIG. 15, according to a program stored in the recording unit of the image processing apparatus.

Hereinafter, the processing of each step of the flowchart illustrated in FIG. 22, will be sequentially described.

(Step S201)

First, in step S201, the image signal processing unit 101 of the image processing apparatus 100, inputs the HDR image signal or the SDR image signal, and determines whether the input image signal is the HDR image or the SDR image.

The type of image can be determined on the basis of image attribute information to be input along with the image, or prior to the image.

Furthermore, the input image is image data included in the broadcasting contents received by the communication unit of the image processing apparatus through a broadcasting wave, the contents acquired from a contents server, or the contents regenerated from a medium such as a Blu-Ray (registered trademark) disc (BD) or a flash memory.

In step S201, in a case where it is determined that the input image is the SDR image, the process proceeds to step S211.

On the other hand, in step S201, it is determined that the input image is the HDR image, the process proceeds to step S221.

(Step S211)

In step S201, in a case where it is determined that the input image is the SDR image, the process proceeds to step S211.

In step S211, the image signal processing unit 101 of the image processing apparatus 100 acquires or generates a gain function of setting a gain for changing the input/output characteristic of the input SDR image.

That is, the gain function is a gain function used for generating a new input/output transfer function (EOTFb:fb(x)) of the SDR image for display, by being applied to the input/output transfer function (EOTFa:fa(x)) of the input SDR image.

The gain function to be applied to the SDR image, is a gain function of setting a gain to be greater than or equal to 1 with respect to all of the input values.

The gain function is the gain function G(x) described above with reference to FIG. 8.

(Step S212)

Next, in step S212, the image signal processing unit 101 of the image processing apparatus 100 generates a new input/output transfer function (EOTFb:fb(x)) of the SDR image for display, by using the input/output transfer function (EOTFa:fa(x)) of the input SDR image, and the gain function G(x).

That is, for example, the new input/output transfer function (EOTFb:fb(x)) of the SDR image for display, is generated according to the following expression.

$$fb(x)=G(x) \times fa(x)$$

(Step S213)

Next, in step S213, the image signal processing unit 101 and the display control unit 102 of the image processing apparatus 100 output the SDR image in which the output (the luminance) based on the input value is set, onto the display unit, according to the new input/output transfer function (EOTFb:fb(x)) of the SDR image for display, generated in step S212.

According to such processing, an image according to a new input/output characteristic generated according to the gain control, but not the original input/output characteristic of the input SDR image, is displayed on the image processing apparatus, for example, the television of the user.

Thus, in the SDR image, the gain control of the gain function G(x) of setting a gain to be greater than or equal to 1 is executed with respect to all of the input signals of 0 to 1, and the pixel value of the SDR image to be displayed, is output with respect to all of the input signal values, as a pixel value (a luminance) higher than the original pixel value (the luminance) of the input SDR image.

As a result thereof, for example, in the case of viewing the SDR image in a bright living room environment, it is possible to display and view sufficiently bright SDR image contents.

On the other hand, in step S201, in a case where it is determined that the input image is the HDR image, the processings of step S221 to S224 are executed.

The processings of step S221 to S224, are processings similar to the processings of steps S102 to S105 described above with reference to the flow illustrated in FIG. 21.

That is, in step S221, the reference point P is selected from the input/output transfer function (EOTFa:fa(x)) of the input HDR image.

In step S222, the gain function G(x) of setting a gain to be greater than or equal to 1 in the input signal range of less than or equal to the input value (In_p) corresponding to the reference point P, and to be less than or equal to 1 in the input signal range of greater than or equal to the input value (In_p) corresponding to the reference point P, is acquired or generated.

In step S223, a new input/output transfer function (EOTFb:fb(x)) for a display image is generated, by using the input/output transfer function (EOTFa:fa(x)) of the input HDR image, and the gain function G(x). According to the following expression, the new input/output transfer function (EOTFb:fb(x)) for a display image is generated.

$$fb(x)=G(x) \times fa(x)$$

Next, in step S224, the HDR image in which the output (the luminance) based on the input value, is set, is output to the display unit, according to the new input/output transfer function (EOTFb:fb(x)) for a display image, generated in step S223.

According to such processing, in the HDR image, a pixel of less than or equal to the highest allowable luminance of the display unit, is displayed at a luminance higher than that of the original image, and for example, in the case of viewing the HDR image in a bright living room environment, it is possible to display and view sufficiently bright HDR image contents.

9. Configuration Example of Image Processing Apparatus

Next, a hardware configuration example of the image processing apparatus of the present disclosure, will be described with reference to FIG. 23.

A central processing unit (CPU) 301 functions as a data processing unit executing various processing according to a program recorded in a read only memory (ROM) 302 or a storage unit 308. For example, the CPU 301 executes the processing according to the sequence described in the examples described above. A program, data, or the like, executed by the CPU 301, is recorded in the random access memory (RAM) 303. The CPU 301, the ROM 302, and the RAM 303 are connected to each other through a bus 304.

The CPU 301 is connected to an input/output interface 305 through the bus 304, and an input unit 306 including various switches, a keyboard, a mouse, a microphone, and the like, and an output unit 307 including a display, a speaker, and the like, are connected to the input/output interface 305. The CPU 301 executes various processings corresponding to a command input from the input unit 306, and outputs a processing result, for example, to the output unit 307.

The storage unit 308 connected to the input/output interface 305, for example, includes a hard disk or the like, and records programs or various data items executed by the CPU 301. A communication unit 309 functions as a transmitting and receiving unit of data communication through a network such as the Internet or a local area network, functions as a transmitting and receiving unit of a broadcasting wave, and communicates with external device.

A drive 310 connected to the input/output interface 305, drives a removable medium 311 such as a semiconductor memory, for example, a magnetic disk, an optical disk, a magneto optical disk, a memory card, or the like, and executes the recording or the reading of the data.

10. Summary of Configurations of Present Disclosure

As described above, the examples of the present disclosure have been described in detail with reference to specific examples. However, it is obvious that the examples can be corrected or substituted by a person skilled in the art, within a range not departing from the gist of the present disclosure. That is, the present invention has been disclosed in the form of exemplification, and should not be interpreted restrictively. In order to judge the gist of the present disclosure, the scope of claims should be taken into consideration.

Furthermore, the technology disclosed herein, can be configured as follows.

(1) An image processing apparatus, including:

an image signal processing unit configured to determine an output value with respect to an input signal value of an input image, in which in a case where a maximum output luminance of the input image is greater than or equal to the highest allowable luminance of a display unit, the image signal processing unit sets a reference point P to be in an input signal position in which an output luminance of the input image is less than or equal to the highest allowable luminance of the display unit, and the image signal processing unit calculates an adjusted luminance for output by multiplying a gain set to be greater than or equal to 1 in an input signal range in which the input signal value is less than or equal to the reference point P, and to be less than or equal to 1 in an input signal range in which the input signal value is greater than or equal to the reference point P, and an output value calculated according to an input/output transfer function corresponding to the input image, together, and generates a display image having the calculated adjusted luminance for output.

(2) The image processing apparatus according to (1), in which the image signal processing unit sets the reference point P to be in a position in which the output luminance of the input image is coincident with the highest allowable luminance of the display unit.

(3) The image processing apparatus according to (1) or (2), in which the image signal processing unit sets the gain corresponding to the input signal value in the input signal range in which the input signal value is greater than or equal to the reference point P, such that the adjusted luminance for output becomes the highest allowable luminance of the display unit.

(4) The image processing apparatus according to (1) or (2), in which the image signal processing unit sets the gain corresponding to the input signal value in the input signal range in which the input signal value is greater than or equal to the reference point P, such that the adjusted luminance for output moderately increases to the highest allowable luminance of the display unit, according to an increase in the input signal value.

(5) The image processing apparatus according to any of (1) to (4), in which the input image is a high dynamic range (HDR) image, and the image signal processing unit calculates the adjusted luminance for output by multiplying the output value calculated according to an input/output transfer function corresponding to the input HDR image, and the gain, together.

(6) The image processing apparatus according to (5), in which the input/output transfer function corresponding to the input HDR image is a function according to an SMPTE ST 2084 curve.

(7) The image processing apparatus according to (5), in which the input/output transfer function corresponding to the input HDR image is a function according to a hybrid log-gamma (HLG) curve.

(8) The image processing apparatus according to any of (1) to (7), in which in a case where a maximum output luminance of the input/output transfer function corresponding to the input image is less than or equal to the highest allowable luminance of the display unit, the image signal processing unit calculates the adjusted luminance for output by multiplying the gain set to be greater than or equal to 1 in all of the input signal value ranges, and the output value calculated according to the input/output transfer function corresponding to the input image, together.

(9) The image processing apparatus according to (8), in which the input image is a standard dynamic range (SDR) image, and the image signal processing unit calculates the adjusted luminance for output by multiplying the output value calculated according to an input/output transfer function corresponding to the input SDR image, and the gain, together.

(10) The image processing apparatus according to any of (1) to (9), in which the image signal processing unit calculates an adjusted luminance for display by applying different gains, according to the type of input/output transfer function corresponding to the input image.

(11) The image processing apparatus according to any of (1) to (10), in which the image signal processing unit calculates an adjusted luminance for display by applying different gains, according to a setting mode of the display unit.

(12) The image processing apparatus according to any of (1) to (11), in which the image signal processing unit sets a position of the reference point P to be in different positions, according to a setting mode of the display unit.

(13) The image processing apparatus according to any of (1) to (12), in which the image signal processing unit sets at least a predetermined range of the input signal range in which the input signal value is less than or equal to the reference point P, to the same gain setting section.

(14) The image processing apparatus according to any of (1) to (13), in which the image signal processing unit calculates an adjusted luminance for display by multiplying the output value calculated by applying an input/output transfer function of absolute value setting of uniquely specifying the output value with respect to an input value, and the gain value, together, the input/output transfer function being the input/output transfer function corresponding to the input image.

(15) The image processing apparatus according to any of (1) to (14), in which the image signal processing unit generates a new input/output transfer function for display by transferring the input/output transfer function corresponding to the input image in which the output luminance with respect to the input signal value of the input image is specified, and in a case where the maximum output luminance of the input image is greater than or equal to the highest allowable luminance of the display unit, the image signal processing unit sets the reference point P to be in the input signal position in which the output luminance of the input image is less than or equal to the highest allowable luminance of the display unit, and the image signal processing unit generates an input/output transfer function for display by applying a gain function of setting the gain to be greater than or equal to 1 in the input signal range in which the input signal value is less than or equal to the reference point P, and to be less than or equal to 1 in the input signal range in which the input signal value is greater than or equal to the reference point P, to the input/output transfer function corresponding to the input image, and calculates the adjusted luminance for output with respect to the input signal value of the input image, according to the generated input/output transfer function for display, and generates the display image having the calculated adjusted luminance for output.

(16) The image processing apparatus according to (15), in which the image signal processing unit generates a new HDR image input/output transfer function for display by applying the gain function to an input/output transfer function corresponding to an input HDR image.

(17) An image processing method to be executed in an image processing apparatus, the image processing apparatus including an image signal processing unit configured to determine an output value with respect to an input signal value of an input image, the method of allowing the image signal processing unit:

to set a reference point P to be in an input signal position in which an output luminance of the input image is less than or equal to the highest allowable luminance of a display unit, in a case where a maximum output luminance of the input image is greater than or equal to the highest allowable luminance of the display unit; and to calculate an adjusted luminance for output by multiplying a gain set to be greater than or equal to 1 in an input signal range in which the input signal value is less than or equal to the reference point P, and to be less than or equal to 1 in an input signal range in which the input signal value is greater than or equal to the reference point P, and an output value calculated according to an input/output transfer function corresponding to the input image, together, and to generate a display image having the calculated adjusted luminance for output.

(18) A program for allowing image processing to be executed in an image processing apparatus including an image signal processing unit configured to determine an output value with respect to an input signal value of an input image, the program of allowing the image signal processing unit:

to set a reference point P to be in an input signal position in which an output luminance of the input image is less than or equal to the highest allowable luminance of a display unit, in a case where a maximum output luminance of the input image is greater than or equal to the highest allowable luminance of the display unit; and to calculate an adjusted luminance for output by multiplying a gain set to be greater than or equal to 1 in an input signal range in which the input signal value is less than or equal to the reference point P, and to be less than or equal to 1 in an input signal range in which the input signal value is greater than or equal to the reference point P, and an output value calculated according to an input/output transfer function corresponding to the input image, together, and to generate a display image having the calculated adjusted luminance for output.

In addition, a set of processings described herein, can be executed by hardware, software, or a composite configuration of both of hardware and software. In the case of executing the processing by software, the processing can be executed by installing a program recording a processing sequence, in a memory of a computer built in dedicated hardware, or can be executed by installing the program in a general-purpose computer capable of executing various processings. For example, the program can be recorded in advance, in a recording medium. In addition to the installation from the recording medium to the computer, the program can be received through a network such as a local area network (LAN) or the Internet, and can be installed in the recording medium such as a built-in hard disk.

Furthermore, various processings described herein, may be executed not only in chronological order according to the description, but also in parallel or individually, according to processing performance of a device executing the processing or as necessary. In addition, herein, the system has a logically assembled configuration of a plurality of devices, but is not limited to a system in which the respective devices of the configuration are in the same housing.

INDUSTRIAL APPLICABILITY

As described above, according to the configuration of one example of the present disclosure, a device and a method are realized in which an HDR image of which a setting luminance is higher than the highest allowable luminance of the display unit, can be displayed as a bright image in a bright audiovisual environment.

Specifically, an adjusted luminance for output is calculated by multiplying an output luminance calculated according to an input/output transfer function corresponding to an input HDR image, and a predetermined gain, together, and thus, a display image is generated. An image signal processing unit sets a reference point P to be in a position where an output value of the input/output transfer function corresponding to the input HDR image, is less than or equal to the highest allowable luminance of the display unit, and calculates the adjusted luminance for output by applying a gain function of setting a gain to be greater than or equal to 1 in an input signal range in which an input signal value is less than or equal to the reference point P, and to be less than or equal to 1 in an input signal range in which the input signal value is greater than or equal to the reference point P, to input HDR image corresponding input/output transfer function, and thus, generates a display image.

According to this configuration, a device and a method are realized in which an HDR image of which a setting luminance is higher than the highest allowable luminance of the display unit, can be displayed as a bright image in a bright audiovisual environment.

REFERENCE SIGNS LIST

10 Image processing apparatus
11 Image signal processing unit
12 Display control unit
13 Display unit
21 Contents production monitor
31 Contents viewing monitor
100 Image processing apparatus
101 Image signal processing apparatus
102 Display control unit
103 Display unit
301 CPU
302 ROM
303 RAM
304 Bus
305 Input/output interface
306 Input unit
307 Output unit
308 Storage unit
309 Communication unit
310 Drive
311 Removable medium

The invention claimed is:

1. An image processing apparatus, comprising:
an image signal processing unit configured to determine an output value with respect to an input signal value of an input image,
wherein, in a case where a maximum output luminance of the input image is greater than or equal to a highest allowable luminance of a display unit, the image signal processing unit sets a reference point P to be in an input signal position in which an output luminance of the input image is less than or equal to the highest allowable luminance of the display unit, and
the image signal processing unit calculates an adjusted luminance for output by multiplying a gain set to be greater than or equal to 1 for each input signal value in an input signal range in which the input signal value is less than or equal to the reference point P, and to be less than or equal to 1 for each input signal value in an input signal range in which the input signal value is greater than or equal to the reference point P, and an output value calculated according to an input/output transfer function corresponding to the input image, together, and generates a display image having the calculated adjusted luminance for output,
wherein the image signal processing unit is implemented via at least one processor.

2. The image processing apparatus according to claim 1, wherein the image signal processing unit sets the reference point P to be in a position in which the output luminance of the input image is coincident with the highest allowable luminance of the display unit.

3. The image processing apparatus according to claim 1, wherein the image signal processing unit sets the gain corresponding to the input signal value in the input signal range in which the input signal value is greater than or equal to the reference point P, such that the adjusted luminance for output becomes the highest allowable luminance of the display unit.

4. The image processing apparatus according to claim 1, wherein the image signal processing unit sets the gain corresponding to the input signal value in the input signal range in which the input signal value is greater than or equal to the reference point P, such that the adjusted luminance for output increases to the highest allowable luminance of the display unit, according to an increase in the input signal value.

5. The image processing apparatus according to claim 1, wherein the input image is a high dynamic range (HDR) image, and
the image signal processing unit calculates the adjusted luminance for output by multiplying an output value calculated according to an input/output transfer function corresponding to the input HDR image, and the gain, together.

6. The image processing apparatus according to claim 5, wherein the input/output transfer function corresponding to the input HDR image is a function according to an SMPTE ST 2084 curve.

7. The image processing apparatus according to claim 5, wherein the input/output transfer function corresponding to the input HDR image is a function according to a hybrid log-gamma (HLG) curve.

8. The image processing apparatus according to claim 1, wherein, in a case where a maximum output luminance of the input/output transfer function corresponding to the input image is less than or equal to the highest allowable luminance of the display unit, the image signal processing unit calculates the adjusted luminance for output by multiplying the gain set to be greater than or equal to 1 in all input signal value ranges of the input signal, and the output value calculated according to the input/output transfer function corresponding to the input image, together.

9. The image processing apparatus according to claim 8, wherein the input image is a standard dynamic range (SDR) image, and the image signal processing unit calculates the adjusted luminance for output by multiplying an output value calculated according to an input/output transfer function corresponding to the input SDR image, and the gain, together.

10. The image processing apparatus according to claim 1, wherein the image signal processing unit calculates an adjusted luminance for display by applying different gains, according to a type of input/output transfer function corresponding to the input image.

11. The image processing apparatus according to claim 1, wherein the image signal processing unit calculates an adjusted luminance for display by applying different gains, according to a setting mode of the display unit.

12. The image processing apparatus according to claim 1, wherein the image signal processing unit sets a position of the reference point P to be in different positions, according to a setting mode of the display unit.

13. The image processing apparatus according to claim 1, wherein the image signal processing unit sets at least a predetermined range of the input signal range in which the input signal value is less than or equal to the reference point P, to a same gain setting section.

14. The image processing apparatus according to claim 1, wherein the image signal processing unit calculates an adjusted luminance for display by multiplying the output value calculated by applying an input/output transfer function of absolute value setting of uniquely specifying the output value with respect to an input value, and a value of the gain, together, the input/output transfer function being the input/output transfer function corresponding to the input image.

15. The image processing apparatus according to claim 1, wherein the image signal processing unit generates a new input/output transfer function for display by transferring the input/output transfer function corresponding to the input image in which the output luminance with respect to the input signal value of the input image is specified, and in a case where the maximum output luminance of the input image is greater than or equal to the highest allowable luminance of the display unit, the image signal processing unit sets the reference point P to be in the input signal position in which the output luminance of the input image is less than or equal to the highest allowable luminance of the display unit, and the image signal processing unit generates an input/output transfer function for display by applying a gain function of setting the gain to be greater than or equal to 1 in the input signal range in which the input signal value is less than or equal to the reference point P, and to be less than or equal to 1 in the input signal range in which the input signal value is greater than or equal to the reference point P, to the input/output transfer function corresponding to the input image, and calculates the adjusted luminance for output with respect to the input signal value of the input image, according to the generated input/output transfer function for display, and generates the display image having the calculated adjusted luminance for output.

16. The image processing apparatus according to claim 15, wherein the image signal processing unit generates a new HDR image input/output transfer function for display by applying the gain function to an input/output transfer function corresponding to an input HDR image.

17. An image processing method to be executed in an image processing apparatus, the method comprising:
determining an output value with respect to an input signal value of an input image;
setting a reference point P to be in an input signal position in which an output luminance of the input image is less than or equal to a highest allowable luminance of a display unit, in a case where a maximum output luminance of the input image is greater than or equal to the highest allowable luminance of the display unit;
calculating an adjusted luminance for output by multiplying a gain set to be greater than or equal to 1 for each input signal value in an input signal range in which the input signal value is less than or equal to the reference point P, and to be less than or equal to 1 for each input signal value in an input signal range in which the input signal value is greater than or equal to the reference point P, and an output value calculated according to an input/output transfer function corresponding to the input image, together; and
generating a display image having the calculated adjusted luminance for output.

18. A non-transitory computer-readable medium having embodied thereon a program, which when executed by a computer causes the computer to execute a method, the method comprising:
determining an output value with respect to an input signal value of an input image;
setting a reference point P to be in an input signal position in which an output luminance of the input image is less than or equal to a highest allowable luminance of a display unit, in a case where a maximum output luminance of the input image is greater than or equal to the highest allowable luminance of the display unit; and
calculating an adjusted luminance for output by multiplying a gain set to be greater than or equal to 1 for each input signal value in an input signal range in which the input signal value is less than or equal to the reference point P, and to be less than or equal to 1 for each input signal value in an input signal range in which the input signal value is greater than or equal to the reference point P, and an output value calculated according to an input/output transfer function corresponding to the input image, together; and
generating a display image having the calculated adjusted luminance for output.

* * * * *